US012671014B2

(12) United States Patent
Kikuchi et al.

(10) Patent No.: US 12,671,014 B2
(45) Date of Patent: Jun. 30, 2026

(54) NIOBIUM-ALUMINUM PRECURSOR WIRE, NIOBIUM-ALUMINUM PRECURSOR TWISTED WIRE, NIOBIUM-ALUMINUM SUPERCONDUCTING WIRE, AND NIOBIUM-ALUMINUM SUPERCONDUCTING TWISTED WIRE

(71) Applicants: NATIONAL INSTITUTE FOR MATERIALS SCIENCE, Ibaraki (JP); Japan Superconductivity Application Development Inc., Kanagawa (JP)

(72) Inventors: Akihiro Kikuchi, Tsukuba (JP); Yasuo Iijima, Tsukuba (JP); Masaru Yamamoto, Chuo (JP); Masatoshi Kawano, Chuo (JP); Masato Otsubo, Tokyo (JP)

(73) Assignees: NATIONAL INSTITUTE FOR MATERIALS SCIENCE, Ibaraki (JP); Japan Superconductivity Application Development Inc., Kanagawa (JP)

( * ) Notice: Subject to any disclaimer, the term of this patent is extended or adjusted under 35 U.S.C. 154(b) by 238 days.

(21) Appl. No.: 18/710,851

(22) PCT Filed: Sep. 6, 2022

(86) PCT No.: PCT/JP2022/033465
§ 371 (c)(1),
(2) Date: May 16, 2024

(87) PCT Pub. No.: WO2023/089919
PCT Pub. Date: May 25, 2023

(65) Prior Publication Data
US 2024/0428965 A1 Dec. 26, 2024

(30) Foreign Application Priority Data
Nov. 16, 2021 (JP) ................................ 2021-186293

(51) Int. Cl.
*H01B 12/00* (2006.01)
*H01B 12/08* (2006.01)
*H01F 6/06* (2006.01)

(52) U.S. Cl.
CPC ............... *H01B 12/08* (2013.01); *H01F 6/06* (2013.01)

(58) Field of Classification Search
CPC ........ H01B 7/0009; H01B 1/026; H01B 7/02; H01B 7/0045; H01B 5/08; H01B 13/02;
(Continued)

(56) References Cited

U.S. PATENT DOCUMENTS 4,003,762 A 1/1977 Ceresara et al.
4,917,965 A * 4/1990 Inoue ..................... H10N 60/20 428/614
2017/0231125 A1* 8/2017 Urashita .............. H01B 7/0216

FOREIGN PATENT DOCUMENTS

JP H06251645 A * 9/1994 ......... H01L 39/2409
JP H09-147635 A 6/1997

OTHER PUBLICATIONS

Office Action issued in Korean Patent Application No. 10-2024-7016134 dated Aug. 14, 2025.
(Continued)

*Primary Examiner* — Pete T Lee
(74) *Attorney, Agent, or Firm* — Morgan, Lewis & Bockius LLP

(57) ABSTRACT

The purpose of the present disclosure is to provide a niobium-aluminum precursor wire having properties such as expression of flexibility and ensuring a large single-wire length, as well as a twisted wire, a superconducting wire, and a superconducting twisted wire formed of the niobium-aluminum precursor wire. The present disclosure provides a niobium-aluminum precursor wire and a twisted wire using the same, the niobium-aluminum precursor wire including:
(Continued)

a rod-like winding core (5) formed of a stabilized copper, or a stabilized copper and an unstabilized copper; a laminated body (3) that is wound around the winding core (5) and that is formed of an aluminum foil and a niobium foil laminated one on the other; and a covering body (1) that covers the circumference of the laminated body and that is formed of a stabilized copper, or a stabilized copper and an unstabilized copper.

13 Claims, 10 Drawing Sheets

(58) Field of Classification Search
CPC .......... H01B 7/04; H01B 1/023; H01B 13/06; H01B 3/308; H01B 7/0216; H01B 7/0275; H01B 7/0876; H01B 7/223; H01B 7/38; H01B 11/002; H01B 11/02; H01B 11/1033; H01B 11/1091; H01B 11/20; H01B 13/0003; H01B 13/0036; H01B 13/01263; H01B 13/0207; H01B 13/14; H01B 13/2606; H01B 3/302; H01B 3/306; H01B 3/36; H01B 3/445; H01B 7/0208; H01B 7/0241; H01B 7/18; H01B 7/188; H01B 7/303; H01B 1/02; H01B 12/16; H01B 13/0006; H01B 3/443; H01B 7/17; H01B 7/1805; H01B 7/1825; H01B 9/00; C22C 9/00; C22C 9/01; C22C 9/02; C22C 9/04; C22C 9/06; C22C 21/00; C22C 21/02; C22C 21/06; C22C 21/08; C22C 21/12; C22C 21/14; C22C 21/16
See application file for complete search history.

(56) References Cited

OTHER PUBLICATIONS

Nishijima et. al., "Strain Dependence of Critical Current for Nb3Al Superconducting Wire Fabricated by Restacked RHQT Process," IEEE Transactions on Applied Superconductivity, 25 (3): 6001104 (2015).
Ceresara et al., "Nb 3 Al formation at temperature lower than 1000° C.," IEEE Transactions on Magnetics, MAG-11 (2): 263-265 (1975).
Hayashi et al., "Current Status of the R&D on Jelly roll Processed Nb 3 Al Conductors," Cryogenics, 33: 629-637 (1998).
Kikuchi, "Looking Back for Research and Development of Nb3Al Wires," Cryogenics, 53 (1): 27-34 (2018).
Kikuchi et al., "Trial Manufacturing of Jelly Rolled Nb/Al Monofilamentary Wire with Very Small Diameter below 50 microns," IOP Conference Series: Materials Science and Engineering, 756: 012016 (2020).
Kikuchi et. al., "Ultra Fine Nb3 Al Mono Core Wires and Cables," IEEE Transactions on Applied Superconductivity, 31 (5): 6000105 (2021).
International Search Report issued in corresponding International Patent Application No. PCT/JP2022/033465 dated Nov. 22, 2022.

* cited by examiner

EXAMPLE OF SECOND ORDER TWISTED WIRE

EXAMPLE OF THIRD ORDER TWISTED WIRE

EXAMPLE OF FIFTH ORDER TWISTED WIRE

NIOBIUM-ALUMINUM PRECURSOR WIRE, NIOBIUM-ALUMINUM PRECURSOR TWISTED WIRE, NIOBIUM-ALUMINUM SUPERCONDUCTING WIRE, AND NIOBIUM-ALUMINUM SUPERCONDUCTING TWISTED WIRE

TECHNICAL FIELD

The present invention relates to a niobium-aluminum precursor wire including: a rod-shaped core that is formed of a copper stabilizer or that is formed of a copper stabilizer and a non-copper stabilizer; a lamination that is wound around the core and that has a structure of overlapping an aluminum foil and a niobium foil each other; and a covering body that covers a periphery of the lamination, wherein the covering body is formed of the copper stabilizer or is formed of the copper stabilizer and the non-copper stabilizer. In particular, the present invention relates to the niobium-aluminum precursor wire, wherein a volume ratio of the copper stabilizer to the non-copper stabilizer, contained in the niobium-aluminum precursor wire is 0.5 or more and 2.0 or less, and the niobium-aluminum precursor wire satisfying, with respect to a total volume of the volume of the copper stabilizer contained in the core and the volume of the copper stabilizer contained in the covering body, the following conditions: (1) a volume percentage of the copper stabilizer contained in the core is in a range of 30% to 70%, and (2) a volume percentage of the copper stabilizer contained in the covering body is in a range of 70% to 30% (wherein a total of the volume percentage of the copper stabilizer contained in the core and the volume percentage of the copper stabilizer contained in the covering body is 100%).

The present invention also relates to a niobium-aluminum precursor twisted wire, which is one twisted wire (so-called "first order twisted wire") formed by carrying out an operation of bundling and twisting two or more niobium-aluminum precursor wires, wherein each of the two or more niobium-aluminum precursor wires is the above-described niobium-aluminum precursor wire.

The present invention also relates to the following: a niobium-aluminum precursor twisted wire, which is one twisted wire (so-called "second order twisted wire") formed by carrying out an operation of bundling and twisting two or more niobium-aluminum precursor twisted wires one time; a niobium-aluminum precursor twisted wire, which is one twisted wire (so-called "third order twisted wire") formed by carrying out the above bundling and twisting operation two times; and a niobium-aluminum precursor twisted wire, which is one twisted wire (so-called "(n+1) order twisted wire") formed by carrying out the above bundling and twisting operation n times (where the n is an integer 3 or more).

The present invention also relates to a niobium-aluminum superconducting wire having a superconducting phase, which is imparted by heat-treating the above-described niobium-aluminum precursor wire. Particularly, the present invention relates to the niobium-aluminum superconducting wire, wherein a superconducting phase includes a phase represented by $Nb_3Al$.

The present invention also relates to a niobium-aluminum superconducting twisted wire having a superconducting phase, which is imparted by heat-treating the above-described niobium-aluminum precursor twisted wire. Particularly, the present invention relates to the niobium-aluminum superconducting twisted wire, wherein a superconducting phase includes a phase represented by $Nb_3Al$.

BACKGROUND ART

In various superconducting application instruments, such as medical MRI, NMR spectrometers, linear motor cars, high-energy particle accelerators, nuclear fusion reactors, superconducting motors and superconducting generators, the performance of the instruments is improved by the increase in magnetic field generated by superconducting electromagnets. Currently, a large number of superconducting electromagnets are manufactured by using a niobium-titanium (NbTi) alloy wire and operated at a temperature equal to or less than liquid helium temperature (4.2 K). The reason is that a niobium-titanium alloy wire can be freely bent (so-called flexible) without deteriorating its characteristics and is thus easily subjected to complicated coiling and insulation treatment and this enables electromagnets to be manufactured at low cost. Also, in the case of niobium-titanium alloy wire, the treatment of the reaction heat is not necessary, so that inexpensive insulating materials such as Kapton tape can be used at room temperature, and coiling can also be precisely carried out at room temperature. Therefore, there is no problem of coil loosening due to thermal expansion, so that magnetic field precision does not decrease.

However, the magnitude of the upper critical magnetic field ($B_{c2}$) at 4.2 K of niobium-titanium alloy is about 10 T, and this is the limit of magnetic field at 4.2 K of an electromagnet manufactured by using a niobium-titanium alloy wire (namely, performance limit in the case of being applied to an apparatus).

Meanwhile, the magnitude of the upper critical magnetic field ($B_{c2}$) of niobium-aluminum ($Nb_3Al$) at 4.2 K is about 26 T, which is two or more times larger than that of niobium-titanium alloy.

Hence, it is expected to use a niobium-aluminum ($Nb_3Al$) wire instead of a niobium-titanium alloy wire in superconducting electromagnets.

Niobium and aluminum have extremely slow diffusion velocities at temperatures of 1,000° C. or less, and thus it is difficult to synthesize an A15-type niobium-aluminum ($Nb_3Al$) superconducting phase. Therefore, in order to synthesize a niobium-aluminum superconducting phase at a temperature of 1,000° C. or less, it is necessary to forcibly shorten the diffusion distance between niobium and aluminum by means of combined processing.

Hence, in "Patent Literature 1" and "Non-Patent Literature 1", a production process which is referred to as the jelly-roll process in which a niobium foil and an aluminum foil as starting materials are rolled to overlap each other has been devised and reported as a production process of a niobium-aluminum ($Nb_3Al$) wire.

"Non-Patent Literature 2" discloses a method for manufacturing a wire rod of a niobium-aluminum ($Nb_3Al$) wire by the following processes: preparing a large number (specifically, 240) of laminations (in "Non-Patent Literature 2", wherein each of the laminations is referred to as a mono-filamentary segment or a filament), wherein each of the laminations has a structure in which, by means of the jelly-roll process, a niobium foil and an aluminum foil are laid to overlap each other and these foils are wound into a roll around a pure copper rod as a core; inserting all the prepared laminations into one pure copper tube to assemble a multifilamentary wire; and subjecting this to extrusion processing, swaging processing, die drawing processing, and the like. In the lamination disclosed in "Non-Patent Literature 2", an Nb barrier layer is provided on the surface of a lamination that is wound around a pure copper rod as a core and that has a structure of overlapping a niobium foil and an aluminum foil each other.

The niobium-aluminum ($Nb_3Al$) wire disclosed in "Non-Patent Literature 3" is also a multifilamentary wire obtained, as in the case with "Non-Patent Literature 2", by the following processes: preparing a plurality of laminations, wherein each of the laminates has a structure in which, by means of the jelly-roll process, a niobium foil and an aluminum foil are laid to overlap each other and are wound into a roll around a pure copper rod as a core; and inserting all the prepared laminations into one pure copper tube.

On the other hand, "Non-Patent Literatures 4 and 5" disclose a niobium-aluminum ($Nb_3Al$) wire having a structure in which, by means of the jelly-roll process, a niobium foil and an aluminum foil are wound into a roll around a pure tantalum rod having an outer diameter of 2 mm as a core to overlap each other, wherein the roll is inserted into a copper tube having an outer diameter of 12.3 mm and an inner diameter of 10.1 mm. "Non-Patent Literatures 4 and 5" disclose that an ultra-fine niobium-aluminum wire having a wire diameter (specifically, outer diameter) of 0.05 mm (i.e., 50 μm) or less when processed into a final wire rod is obtained, and the outer diameter of the thinnest ultra-fine niobium-aluminum ($Nb_3Al$) wire disclosed in the non-patent literatures is 0.03 mm (i.e., 30 μm). "Non-Patent Literature 4" discloses that as an ultra-fine niobium-aluminum wire of 0.05 mm (i.e., 50 μm) or less, one having a length exceeding 100 m is obtained.

CITATION LIST

Patent Literature

PATENT LITERATURE 1: U.S. Pat. No. 4,003,762 A

Non-Patent Literature

NON-PATENT LITERATURE 1: S. Ceresara et. al., "$Nb_3Al$ formation at temperature lower than 1000° C.", IEEE Trans. Mag, MAG-11 (1975) p. 263-265

NON-PATENT LITERATURE 2: Kazuhiko HAYASHI, "Current Status of the R&D on Jelly-roll Processed $Nb_3Al$ Conductors", Cryogenics, 33 (1998) p. 629-637

NON-PATENT LITERATURE 3: Akihiro KIKUCHI, "Looking Back for Research and Development of $Nb_3Al$ Wires", Cryogenics, 53 (2018) p. 27-34

NON-PATENT LITERATURE 4: A. Kikuchi et al., "Trial Manufacturing of Jelly-Rolled Nb/Al Monofilamentary Wire with Very Small Diameter below 50 microns", IOP Conference Series: Materials Science and Engineering, 756 (2020) 012016.

NON-PATENT LITERATURE 5: A. Kikuchi, et. al., "Ultra-Fine $Nb_3Al$ Mono-Core Wires and Cables", IEEE Trans. Appl. Supercond., Vol. 31 (2021) 6000105)

SUMMARY OF INVENTION

Technical Problem

Niobium-aluminum ($Nb_3Al$) is different from a niobium-titanium alloy, and is classified as an A15-type intermetallic compound rather than an alloy, and has hard and brittle mechanical properties. This means that a niobium-aluminum ($Nb_3Al$) superconducting wire breaks easily and is extremely hardly coiled, which is different from a niobium-titanium alloy wire. Therefore, in the case of manufacturing an electromagnet by using a niobium-aluminum superconducting wire, generally, niobium and aluminum immediately after being processed into a wire rod (specifically, wire drawing processing) are covered (so-called "insulation treatment") with an insulating material in an unreacted state, the covered wire rod is coiled, and then the final heat treatment is carried out. This method is generally referred to as the wind & react process. However, this method has a problem that thermal expansion and the like generated by heat treatment may cause looseness in tightly wound coils, making the wire rod easier to move or reducing magnetic field precision.

On the other hand, in the case of niobium-titanium alloy wire, as described above, the treatment of the reaction heat is not necessary, so that inexpensive insulating materials such as Kapton tape can be used at room temperature, and coiling can also be precisely carried out at room temperature. Therefore, there is no problem of coil loosening due to thermal expansion, so that magnetic field precision does not decrease. This is the reason why a large number of superconducting electromagnets are currently manufactured by using a niobium-titanium (NbTi) alloy wire.

However, as described above, the upper critical magnetic field ($B_{c2}$) value of niobium-aluminum at 4.2 K is two or more times larger than that of niobium-titanium alloy, and thus if the niobium-aluminum wire after treating the reaction heat can exert bendability (so-called "flexibility"), the above-described insulation treatment and coiling can be realized by handling similar to that of the niobium-titanium alloy wire. As a result, the practical application of niobium-aluminum wire comes to be accelerated at once. In this case, it is also important to prevent wire breakage on the way of the processing and to secure a single wire length (i.e., length of one wire with no joints) as long as possible. This is because as the single wire length is longer, the production efficiency and yield are further improved, and the manufacturing cost is more greatly reduced. Also, in the case of using a niobium-aluminum wire as a superconducting wire, when the proportion of the copper stabilizer in the niobium-aluminum superconducting wire is small, the wire rod is burnt out in the unlikely event that the superconducting state is broken and quenching occurs. Therefore, in order to use the niobium-aluminum wire as a general practical wire rod (namely, a wire rod that is put to practical use), it is also important that the niobium-aluminum wire is one that can freely increase the proportion of the copper stabilizer to such a proportion as the proportion of the copper stabilizer in the wire rod (specifically; the volume ratio of the copper stabilizer to the non-copper stabilizer in the wire rod (in the present application, this volume ratio is also referred to as "copper ratio")) comes to be at least about 1.0 (preferably 2.0).

In order to solve such problems, as described above, a number of studies on the development of niobium-aluminum wire have been conducted and reported.

However, all of the niobium-aluminum ($Nb_3Al$) wires reported in "Patent Literature 1" and "Non-Patent Literature 1" can only be processed into wire rods having a wire diameter of 0.2 mm when processed into the final wire rods. In other words, by using the niobium-aluminum ($Nb_3Al$) wires reported in "Patent Literature 1" and "Non-Patent Literature 1", wire rods having a wire diameter smaller than 0.2 mm when the wires are processed into final wire rods cannot be provided. Therefore, there is a problem that it is difficult to exert bendability (so-called "flexibility").

The jelly-roll process reported in "Patent Literature 1" and "Non-Patent Literature 1" is characterized by using a thin foil as a starting material, but as reported in "Patent Literature 1", in order to obtain excellent characteristics by means of this production method, it is necessary to reduce the thickness of the aluminum foil after carrying out wire rod processing (specifically, wire drawing processing) to at least 0.0015 mm (1.5 μm) or less and to process the entire wire rod thinner. As the thickness of the aluminum foil after carrying out wire rod processing is thinner, the characteristics are further improved, but as the thickness of the aluminum foil is thinner, wire rod processing is more difficult. In other words, it is greatly difficult to obtain an ultra-fine wire rod having a greatly small wire diameter. In fact, both of the smallest wire diameters when the above niobium-aluminum ($Nb_3Al$) wires reported in "Patent Literature 1" and "Non-Patent Literature 1" are processed into final wire rods are 0.2 mm, and the wires cannot be processed to have a wire diameter smaller than 0.2 mm.

As described above, the niobium-aluminum ($Nb_3Al$) wire disclosed in "Non-Patent Literature 2" is a composite of metals such as niobium, aluminum, and copper that have different hardnesses, elongations, and mechanical properties such as work-hardening rate and plastic working limit, so that it is not easy to balance the workability of the entire wire rod.

The above niobium-aluminum wire disclosed in "Non-Patent Literature 2" is a multifilamentary wire that is composed of a monofilamentary segment having a core formed of a pure copper rod, and one pure copper tube into which 240 monofilamentary segments are inserted. In order for the niobium-aluminum wire to be put to practical use as a superconducting wire, the niobium-aluminum wire is required to have a composite structure in which a pure metal which is referred to as a stabilizing material that has an excellent electric conductivity at extremely low temperatures served as a bypass route in the unlikely event that the superconducting state is broken is necessarily composited as a material thereof. As the stabilizing material, pure copper such as oxygen free copper is generally used and is referred to as a copper stabilizer. In the above niobium-aluminum ($Nb_3Al$) wire disclosed in "Non-Patent Literature 2", a pure copper rod that serves as a core and one pure copper tube into which 240 monofilamentary segments are inserted comes to function as a copper stabilizer, so that the copper of them are practically essential components.

In the lamination disclosed in "Non-Patent Literature 2", an Nb barrier layer is provided on the surface of a lamination that is wound around a pure copper rod as a core and that has a structure of overlapping a niobium foil and an aluminum foil each other This is a reaction barrier, namely from point of view that when the aluminum foil comes into direct contact with the pure copper rod that serves as a core or the pure copper tube, the contact portion may remarkably undergo a reaction during the final heat treatment to deteriorate the properties of niobium-aluminum, a reaction barrier to prevent such a reaction.

Hence, the above niobium-aluminum wire disclosed in "Non-Patent Literature 2" is inevitably a composite of metals such as niobium, aluminum, and copper that have different hardnesses, elongations, and mechanical properties such as work hardening rate and plastic working limit, so that it is not easy to balance the workability of the entire wire rod.

Moreover, since the above niobium-aluminum ($Nb_3Al$) wire disclosed in "Non-Patent Literature 2" is a multifilamentary wire that is assembled by inserting as many as 240 monofilamentary segments into one pure copper tube, the monofilamentary segments adhere to each other and are integrated as a whole. Therefore, the multifilamentary wire described in "Non-Patent Literature 2" has the following problem: the multifilamentary wire cannot be freely bent without deteriorating its characteristics, thereby resulting in poor bendability (so-called "flexibility"), and the neutral axis of bending is at the center of the entire multifilamentary wire, thereby resulting in a greatly large strain applied to the center. For example, when the above niobium-aluminum wire disclosed in "Non-Patent Literature 2" is bent with a small radius of curvature of several tens of millimeters, the above niobium-aluminum wire disclosed therein breaks and cause the breakage thereof or its characteristics are deteriorated.

As described above, the above niobium-aluminum wire of the multifilamentary wire disclosed in "Non-Patent Literature 2" also has a problem that bendability (so-called "flexibility") is difficult to exert.

The niobium-aluminum ($Nb_3Al$) wire disclosed in "Non-Patent Literature 3" also has the same structure as that in "Non-Patent Literature 2", and thus has the same problem as that in "Non-Patent Literature 2".

In the case of manufacturing a niobium-aluminum ($Nb_3Al$) wire by means of the jelly roll process, as described above, it is necessary to reduce the thickness of the aluminum foil after carrying out wire rod processing (specifically, wire drawing processing) to at least 0.0015 mm (i.e., 1.5 μm) or less and to process the entire wire rod thinner. The case where the number of laminations to be inserted into one pure copper tube is one, wherein the lamination has a structure in which an niobium foil and an aluminum foil are laid to overlap each other and are wound into a roll around a pure copper rod as a core (here, taking "Non-Patent Literature 2" as an example, the lamination corresponds to the "monofilamentary segment" or "filament" disclosed in the non-patent literature) is referred to as a monofilamentary wire. And, in the case where the number of the above laminations to be inserted into one pure copper tube is several tens to several hundreds, the wire is referred to as a multifilamentary wire. It is relatively easier to reduce the final thickness of an aluminum foil after carrying out wire drawing processing to 0.0015 mm (i.e., 1.5 μm) or less in the multifilamentary wire than in the monofilamentary wire. In the method for the production of a niobium-aluminum ($Nb_3Al$) wire of a multifilamentary wire, the workability of the lamination of a niobium foil and an aluminum foil affects the workability of the entire wire rod, and thus there are a large number of reports in which the outer diameter of wire rod is set to about 0.8 to 1.5 mm. In fact, in "Non-Patent Literature 2" as well, the outer diameter of wire rod is 0.81 mm. In other words, since in the niobium-aluminum wire of a multifilamentary wire, the final thickness of the aluminum foil after carrying out the wire drawing processing thereof can be easily reduced to 0.0015 mm (i.e., 1.5 μm) or less without processing the niobium-aluminum wire of the multifilamentary wire into a wire rod having an outer diameter of 0.1 mm (i.e., 100 μm) or less, there has been no report that the wire rod outer diameter of the multifilamentary wire is 0.1 mm (i.e., 100 μm) or less yet, as far as the present inventors know.

Regarding the monofilamentary wires disclosed in "Patent Literature 1" and non-patent literatures, there has been no report that a monofilamentary wire having a wire rod outer diameter of 0.1 mm (i.e., 100 μm) or less are processed, until "Non-Patent Literatures 4 and 5" have been published, as far as the present inventors know.

As described above, the niobium-aluminum ($Nb_3Al$) wire disclosed in each of recently published "Non-Patent Literatures 4 and 5" is so-called monofilamentary wire having a structure in which a niobium foil and an aluminum foil are wound around a pure tantalum rod having an outer diameter of 2 mm as a core to overlap each other and inserted into a copper tube having an outer diameter of 12.3 mm and an inner diameter of 10.1 mm. And, the niobium-aluminum ($Nb_3Al$) wire disclosed therein is ultra-fine niobium-aluminum ($Nb_3Al$) wire having an outer diameter of 0.05 mm (i.e., 50 μm) or less, which is thinner than a human hair. Therefore, even in a niobium-aluminum ($Nb_3Al$) wire having hard and brittle mechanical properties, the bending strain applied from the outside can be reduced by processing the outer diameter thereof thinner, and the wire does not break and cause the breakage thereof or its characteristics are not deteriorated even when being bent with a small radius of curvature of several tens of millimeters. Such an outer diameter of 50 μm or less is also preferable in terms that not only the bending strain is reduced but also the essential stability of the niobium-aluminum superconducting wire portion in the magnetic field can be secured in the case of being processed into a niobium-aluminum superconducting wire. An ultra-fine niobium-aluminum ($Nb_3Al$) wire having an outer diameter of 0.05 mm (i.e., 50 μm) or less, which is thinner than a human hair, is preferable in terms that bendability (so-called "flexibility") is exerted and insulation treatment and coiling can be realized by handling similar to that of a niobium-titanium alloy wire even in the case where electromagnets are manufactured by using a niobium-aluminum ($Nb_3Al$) superconducting wire.

However, in an ultra-fine niobium-aluminum ($Nb_3Al$) wire disclosed in each of "Non-Patent Literatures 4 and 5", the proportion of the copper stabilizer therein is small because the proportion of the copper stabilizer in the niobium-aluminum wire, specifically, the proportion of the copper stabilizer to the non-copper stabilizer in the niobium-aluminum wire (namely, copper ratio) is about 0.5. In order to use the above niobium-aluminum wire as a general practical wire rod, it is necessary to increase the proportion of the copper stabilizer therein to such a proportion as the copper ratio in the niobium-aluminum wire (specifically, the volume ratio of the copper stabilizer therein to the non-copper stabilizer therein) comes to be at least about 1.0. In other words, the above niobium-aluminum wire is required to be an ultra-thin niobium-aluminum ($Nb_3Al$) wire, wherein the proportion of the copper stabilizer in the ultra-thin niobium-aluminum ($Nb_3Al$) wire can be increased to such a proportion as the above volume ratio comes to be at least about 1.0. However, at present, when the above volume ratio is set to 1.0 or more in the ultra-fine niobium-aluminum ($Nb_3Al$) wire disclosed in each of "Non-Patent Literatures 4 and 5", wire breakage frequently occurs on the way of wire drawing processing, and it has not been realized to decrease the outer diameter thereof to 50 μm.

As for the proportion of the copper stabilizer, since the wire rod is burnt out in the unlikely event that the superconducting state is broken and quenching is carried out when the proportion of the copper stabilizer in the ultra-fine niobium-aluminum superconducting wire is small in the case where an ultra-fine niobium-aluminum wire is processed into a superconducting wire, the proportion of the copper stabilizer per the total cross-sectional area of the wire rod is preferably large. Specifically, it is preferable that the above volume ratio is set to 0.5 or more. In consideration of the use as a general practical wire rod, it is more preferable that the volume ratio is set to about 1.0 (specifically, 0.9 or more), as described above. On the contrary, when the proportion of the copper stabilizer in the wire rod is too large, the proportion of the superconductivity comes to be relatively small and the superconducting effect thereof is weakened, and thus it is realistic that the above volume ratio is set to at most about 2.0 (specifically, 2.0 or less). In other words, regarding an ultra-fine niobium-aluminum wire, it is desirable that the volume ratio of the copper stabilizer to the non-copper stabilizer, contained in the niobium-aluminum precursor wire can be freely maintained in the range of 0.5 or more and 2.0 or less in the case where the niobium-aluminum wire is processed into a superconducting wire.

Also, it is necessary to prevent wire breakage on the way of the processing and to secure, as long as possible, a single wire length. The single wire length is preferably longer, thereby improving the production efficiency and yield, and significantly reducing the cost. Therefore, the niobium-aluminum wire that can secure a single wire length at least on a scale of 1,000 m is preferable.

However, in the case where the outer diameter is 50 μm, the single wire length of the niobium-aluminum wire is 128 m in "Non-Patent Literature 4" and 400 m in "Non-Patent Literature 5", and in both cases, wire breakage occurs at a single wire length shorter than 1,000 m.

As described above, regarding a niobium-aluminum wire, the wire has not yet been developed, which has all of the following characteristics:

- a characteristic that a niobium-aluminum wire after carrying out the reaction heat treatment can exert bendability (so-called "flexibility"), and insulation treatment and coiling thereof can be realized by handling similar to that of a niobium-titanium alloy wire even in the case where electromagnets are manufactured by using a niobium-aluminum ($Nb_3Al$) superconducting wire;
- a characteristic that a long single wire length of 1,000 m or more can be secured; and
- a characteristic that the proportion of the copper stabilizer can increase to such a proportion as the proportion of the copper stabilizer in the wire rod (specifically, the volume ratio (i.e., copper ratio) of the copper stabilizer to the non-copper stabilizer, in the wire rod) comes to be at least about 1.0 (preferably, a characteristic that the volume ratio of the copper stabilizer to the non-copper stabilizer, contained in the wire rod can be freely maintained in the range of 0.5 or more and 2.0 or less).

Therefore, from such a viewpoint, the development of a novel niobium-aluminum wire has been still desired, and the development thereof has become a problem to be solved.

Solution to Problem

As a result of intensive studies on experimental manufacture of an extremely large number of niobium-aluminum wires and the performance and the like thereof, the present inventors have coincidentally and firstly found out the following: by using the niobium-aluminum wire having a structure covered with a copper tube containing a copper stabilizer, wherein a lamination that has a structure of overlapping an aluminum foil and a niobium foil each other and that is wound into a roll around a copper core containing the copper stabilizer is inserted into the copper tube, and further by setting the total amounts of the copper stabilizers (specifically, pure coppers) disposed in the two places of the above core located at the center of the lamination and the copper tube located at the outer periphery of the lamination to a predetermined range, the mechanical characteristics of the entire wire rod can be balanced even when the wire is a niobium-aluminum wire that is a composite of metals having different hardnesses, elongations, and mechanical properties such as work hardening rate and plastic working limit, thereby providing the niobium-aluminum wire in which wire breakage can be prevented even when a copper ratio is such a value as having caused the wire breakage in previously known niobium-aluminum wires with an outer diameter of 50 μm or less (specifically, the case where the volume ratio of the copper stabilizer to the non-copper stabilizer, in the wire is about 1.0) as well as a long single wire length of 1,000 m or more can be secured even when an outer diameter is a thin wire of 50 μm or less. As a result, the present inventors have completed the present invention.

Specifically, the present invention has the following aspects [1] to [13].

[1] A niobium-aluminum precursor wire comprising:

a rod-shaped core that is formed of a copper stabilizer or that is formed of a copper stabilizer and a non-copper stabilizer;

a lamination that is wound around the core and that has a structure of overlapping an aluminum foil and a niobium foil each other; and a covering body that covers a periphery of the lamination, wherein the covering body is formed of the copper stabilizer or is formed of the copper stabilizer and the non-copper stabilizer, wherein a volume ratio of the copper stabilizer to the non-copper stabilizer, contained in the niobium-aluminum precursor wire is 0.5 or more and 2.0 or less; and the niobium-aluminum precursor wire satisfying, with respect to a total volume of the volume of the copper stabilizer contained in the core and the volume of the copper stabilizer contained in the covering body, the following conditions:

(1) a volume percentage of the copper stabilizer contained in the core is in a range of 30% to 70%; and (2) a volume percentage of the copper stabilizer contained in the covering body is in a range of 70% to 30%, wherein a total of the volume percentage of the copper stabilizer contained in the core and the volume percentage of the copper stabilizer contained in the covering body is 100%.

[2] The niobium-aluminum precursor wire according to [1], wherein the volume ratio of the copper stabilizer to the non-copper stabilizer, contained in the precursor wire is 0.9 or more and 2.0 or less.

[3] The niobium-aluminum precursor wire according to [1] or [2], comprising a layer formed of a substance exhibiting low reactivity to an aluminum and a copper, wherein the layer is between the core and the lamination.

[4] The niobium-aluminum precursor wire according to any one of [1] to [3], comprising a layer formed of a substance exhibiting low reactivity to an aluminum and a copper, wherein the layer is between the lamination and the covering body.

[5] The niobium-aluminum precursor wire according to any one of [1] to [4], having an outer diameter of 0.05 mm or less.

[6] A niobium-aluminum precursor twisted wire, which is one first order twisted wire formed by carrying out an operation of bundling and twisting two or more niobium-aluminum precursor wires, wherein each of the two or more niobium-aluminum precursor wires is the niobium-aluminum precursor wire according to any one of [1] to [5].

[7] A niobium-aluminum precursor twisted wire, which is one second order twisted wire formed by carrying out, one time, an operation of bundling and twisting two or more niobium-aluminum precursor twisted wires, wherein each of the two or more niobium-aluminum precursor twisted wires used in the bundling and twisting operation is the niobium-aluminum precursor twisted wire according to [6].

[8] A niobium-aluminum precursor twisted wire, which is one third order twisted wire formed by carrying out, two times, an operation of bundling and twisting two or more niobium-aluminum precursor twisted wires, wherein the niobium-aluminum precursor twisted wire of the one third order twisted wire manufactured by the bundling and twisting operation carried out for a second time is one manufactured by carrying out the operation of bundling and twisting two or more niobium-aluminum precursor twisted wires, wherein each of the two or more niobium-aluminum precursor twisted wires is one manufactured by the bundling and twisting operation carried out for a first time, and wherein each of two or more niobium-aluminum precursor twisted wires used in the bundling and twisting operation carried out for the first time is the niobium-aluminum precursor twisted wire according to [6].

[9] A niobium-aluminum precursor twisted wire, which is an (n+1) order twisted wire formed by carrying out, n times (wherein the n is an integer 3 or more), an operation of bundling and twisting two or more niobium-aluminum precursor twisted wires to form one twisted wire, wherein a niobium-aluminum precursor twisted wire manufactured by the bundling and twisting operation carried out at each time after a second time is one manufactured by carrying out the operation of bundling and twisting two or more niobium-aluminum precursor twisted wires, wherein each of the two or more niobium-aluminum precursor twisted wires is one manufactured by carrying out the bundling and twisting operation one before manufacturing the each of the two or more niobium-aluminum precursor twisted wires, and wherein each of two or more niobium-aluminum precursor twisted wires used in the bundling and twisting operation carried out for a first time is the niobium-aluminum precursor twisted wire according to [6].

[10] A niobium-aluminum superconducting wire, comprising a superconducting phase imparted by heat-treating the niobium-aluminum precursor wire according to any one of [1] to [5].

[11] The niobium-aluminum superconducting wire according to [10], wherein the superconducting phase comprises a phase represented by $Nb_3Al$.

[12] A niobium-aluminum superconducting twisted wire, comprising a superconducting phase imparted by heat-treating the niobium-aluminum precursor twisted wire according to any one of [6] to [9].

[13] The niobium-aluminum superconducting twisted wire according to [12], wherein the superconducting phase comprises a phase represented by $Nb_3Al$.

Advantageous Effects of Invention

According to an aspect of the present invention, a novel niobium-aluminum precursor wire different from existing niobium precursor wires as a niobium precursor wire can be provided.

According to the niobium-aluminum precursor wire of an aspect of the present invention, for example, an ultra-fine niobium-aluminum precursor wire having an outer diameter of 50 μm or less, which is thinner than a human hair can be provided. As a result, for example, according to the niobium-aluminum precursor wire of the present invention, bendability (so-called "flexibility.") can be exerted. Specifically, for example, effects that the wire does not break and cause the wire breakage or its characteristics are not deteriorated even when being bent with a small radius of curvature of several tens of millimeters can be provided. According to the present invention, such bendability (so-called "flexibility") can be exerted, so that insulation treatment and coiling can be realized by handling similar to that of a niobium-titanium alloy wire, for example, even in the case where electromagnets are manufactured by using a niobium-aluminum ($Nb_3Al$) superconducting wire, and the wire can exert high performance that is two or more times higher than that of a niobium-titanium alloy wire while exhibiting handling properties similar to those of a niobium-titanium alloy wire that is put to practical use.

According to the niobium-aluminum precursor wire of an aspect of the present invention, for example, the copper stabilizer can be provided in the range of 0.5 or more and 2.0 or less as a volume ratio (i.e., copper ratio) of the copper stabilizer to the non-copper stabilizer in the wire rod, so that the above wire can be sufficiently used as a general practical wire rod, and magnetic instability (for example, flux jump) of a niobium-titanium alloy wire can be suppressed.

According to an aspect of the present invention, a novel niobium-aluminum precursor twisted wire can be provided by the following processes: carrying out an operation of bundling and twisting two or more niobium-aluminum precursor wires, wherein each of the two or more niobium-aluminum precursor wires is the above-described niobium-aluminum precursor wire; and forming one twisted wire (so-called "first order twisted wire") by the bundling and twisting operation. Therefore, according to the present invention, for example, a novel niobium-aluminum precursor twisted wire that is one twisted wire (so-called "second order twisted wire") formed by carrying out, one time, an operation of bundling and twisting two or more niobium-aluminum precursor twisted wires (i.e., first order twisted wires); a novel niobium-aluminum precursor twisted wire that is one twisted wire (so-called "third order twisted wire") formed by carrying out, two times, the bundling and twisting operation; and a novel niobium-aluminum precursor twisted wire that is one twisted wire (so-called "(n+1) order twisted wire") formed by carrying out, n times (wherein the n is an integer 3 or more), the bundling and twisting operation can be provided.

According to the niobium-aluminum precursor twisted wire of an aspect of the present invention, the niobium-aluminum precursor wires (so-called "element wires"), each of which is a basic unit constituting a twisted wire, are in contact with each other, but do not adhere to each other, so that even in a state where the two or more element wires are bundled and twisted into an assembly, the niobium-aluminum precursor wires of the element wires can easily slide in the assembly. Therefore, the neutral axis of bending is located almost at the center of the element wires and hardly changes, so that favorable bendability (so-called "flexibility") can be maintained according to the niobium-aluminum precursor twisted wire of the present invention.

According to an aspect of the present invention, a novel niobium-aluminum superconducting wire or niobium-aluminum superconducting twisted wire having a superconducting phase can be provided by heat-treating the above niobium-aluminum precursor wire or the above niobium-aluminum precursor twisted wire.

According to the niobium-aluminum superconducting wire or the niobium-aluminum superconducting twisted wire of an aspect of the present invention, the performance of the above niobium-aluminum precursor wire which is a precursor of the niobium-aluminum superconducting wire or the above niobium-aluminum precursor twisted wire which is a precursor of the niobium-aluminum superconducting twisted wire can be inherited. Therefore, according to the novel niobium-aluminum superconducting wire or niobium-aluminum superconducting twisted wire of the present invention, for example, favorable bendability (so-called "flexibility") can be exerted, so that insulation treatment and coiling can be realized by handling similar to that of a niobium-titanium alloy wire even in the case where electromagnets are manufactured by using the above niobium-aluminum superconducting wire or the above niobium-aluminum superconducting twisted wire. As a result, according to the novel niobium-aluminum superconducting wire or niobium-aluminum superconducting twisted wire of the present invention, for example, it is promising for the realization of various superconducting application instruments, such as medical MRI, NMR spectrometers, linear motor cars, high-energy particle accelerators, nuclear fusion reactors, superconducting motors and superconducting generators, and it is expected that the performance of the superconducting application instruments is improved. Alternatively, for example, conventional niobium-aluminum superconducting wires and twisted wire cables can be provided at low cost, which can be expected to bring enormous technical and economic effects. Alternatively, it is easy to bundle and twist ultra-fine niobium-aluminum superconducting wires or niobium-aluminum superconducting twisted wires from two or more wires to tens of thousands of wires, so that it is expected that, for example, an increase in size of the current carrying capacity comes to easier.

DESCRIPTION OF THE EMBODIMENTS

Figure 1:
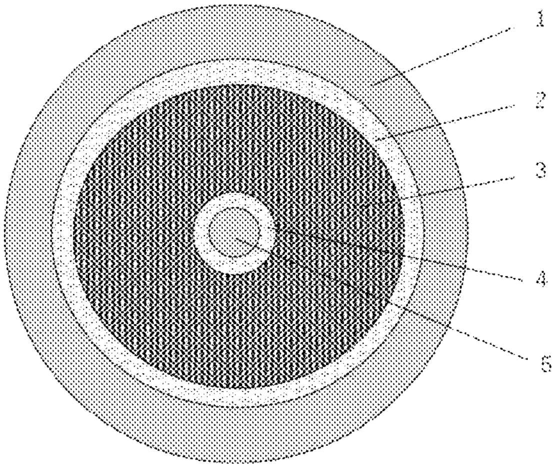
FIG. 1 is a cross-sectional view of a niobium-aluminum precursor wire of an aspect of the present invention.

Hereinafter, exemplary embodiments of the present invention will be described in detail. It should be noted that the present invention is not limited to the following embodiments, and can be implemented with various modifications within the scope of the gist thereof.

As described above, the niobium-aluminum precursor wire of an aspect of the present invention includes: a rod-shaped core that is formed of a copper stabilizer or that is formed of a copper stabilizer and a non-copper stabilizer; a lamination that is wound around the core and that has a structure of overlapping an aluminum foil and a niobium foil each other; and a covering body that covers a periphery of the lamination, wherein the covering body is formed of the copper stabilizer or is formed of the copper stabilizer and the non-copper stabilizer. In addition, in the above niobium-aluminum precursor wire, a volume ratio of the copper stabilizer to the non-copper stabilizer, contained therein is 0.5 or more and 2.0 or less, and the above niobium-aluminum precursor wire satisfies, with respect to a total volume of the volume of the copper stabilizer contained in the core and the volume of the copper stabilizer contained in the covering body, the following conditions: (1) a volume percentage of the copper stabilizer contained in the core is in a range of 30% to 70%; and (2) a volume percentage of the copper stabilizer contained in the covering body is in a range of 70% to 30%, (wherein a total of the volume percentage of the copper stabilizer contained in the core and the volume percentage of the copper stabilizer contained in the covering body is 100%).

In the present application, the term "niobium-aluminum precursor wire" means a niobium-aluminum ($Nb_3Al$) wire that is only subjected to wire rod processing (specifically, wire drawing processing) and is not subjected to heat treatment. On the other hand, a superconducting wire manufactured by heat-treating the niobium-aluminum wire is referred to as a "niobium-aluminum superconducting wire" in the present application.

As understood from the facts that the niobium-aluminum precursor wire of an aspect of the present invention has a structure of including the following: a rod-shaped core that is formed of a copper stabilizer or that is formed of a copper stabilizer and a non-copper stabilizer; a lamination that is wound around the core and that has a structure of overlapping an aluminum foil and a niobium foil each other; and a covering body that covers a periphery of the lamination, wherein the covering body is formed of the copper stabilizer or is formed of the copper stabilizer and the non-copper stabilizer, the above niobium-aluminum precursor wire is a so-called "monofilamentary wire".

Both of the "rod-shaped core" that constitutes the above niobium-aluminum precursor wire and the "covering body" that covers the periphery of the "lamination that has a structure of overlapping an aluminum foil and a niobium foil each other" are formed of a copper stabilizer or formed of a copper stabilizer and a non-copper stabilizer. Both of the above "rod-shaped core" and the above "covering body" are preferably formed of a copper stabilizer.

The "copper stabilizer" is pure copper such as oxygen free copper, and is a stabilizing material. This is because in the case where a niobium-aluminum precursor wire is put to practical use as a superconducting wire, in the unlikely event that the superconducting state is broken, the niobium-aluminum precursor wire is required to have a composite structure in which a pure metal that is a material (this material is referred to as a "stabilizing material") that has an excellent electric conductivity at extremely low temperatures served as a bypass route is necessarily composited as a material thereof, and as the pure metal, pure copper is preferable.

The "non-copper stabilizer" means a material other than the above copper stabilizer.

The "rod-shaped core" literally has a rod-like shape, and the shape of the core is not particularly limited as long as the objects of the present invention can be achieved.

The "lamination that has a structure of overlapping an aluminum foil and a niobium foil each other" means the thing which overlaps one aluminum foil and one niobium foil each other. Usually, the thickness of the aluminum foil is preferably 0.1 mm (i.e., 100 μm), and the thickness of the niobium foil is preferably 0.03 mm (i.e., 30 μm). However, the thicknesses are not particularly limited to these values as long as the objects of the present invention can be achieved, and it is more preferable as the thicknesses are thinner.

Also, usually, it is preferable that the aluminum foil and the niobium foil are laid to overlap each other so that the side in contact with the core is the aluminum foil. However, the order is not particularly limited to this order as long as the objects of the present invention can be achieved.

In order that the lamination having a structure of overlapping the aluminum foil and the niobium foil each other is wound around the rod-shaped core, it is only required that the lamination having a structure of overlapping the aluminum foil and the niobium foil each other is wound into a roll around the rod-shaped core.

The form of the "covering body" that covers the periphery of the lamination having a structure of overlapping an aluminum foil and a niobium foil each other is not particularly limited as long as the covering body is formed of the copper stabilizer or is formed of the copper stabilizer and the non-copper stabilizer, as described above. The form of the covering body is usually one copper tube.

In the niobium-aluminum precursor wire, the volume ratio of the copper stabilizer to the non-copper stabilizer, contained therein is 0.5 or more and 2.0 or less. When the lower limit is set to 0.5 or more, the proportion of the copper stabilizer in the ultra-fine niobium-aluminum superconducting wire increases in the case where an ultra-fine (specifically, 50 μm or less) niobium-aluminum wire is processed into a superconducting wire, and thus a situation in which the wire rod is burnt out in the unlikely event that the superconducting state is broken and quenching occurs is preferably avoided. From such a point of view; the lower limit of the volume ratio of the copper stabilizer to the non-copper stabilizer is set to preferably 0.9 or more, and more preferably 1.0 or more. When the upper limit is set to 2.0 or less, a situation in which for the reason that the proportion of the copper stabilizer in the ultra-fine niobium-aluminum superconducting wire is too large, the proportion of superconductivity is relatively small and the superconducting effect is weakened can be preferably avoided.

The above niobium-aluminum precursor wire satisfies, with respect to a total volume of the volume of the copper stabilizer contained in the core and the volume of the copper stabilizer contained in the covering body, the following conditions: (1) a volume percentage of the copper stabilizer contained in the core is in a range of 30% to 70%, and (2) a volume percentage of the copper stabilizer contained in the covering body is in a range of 70% to 30%. Here, a total of the volume percentage of the copper stabilizer contained in the core and the volume percentage of the copper stabilizer contained in the covering body is 100%.

When the volume percentage of the copper stabilizer contained in the core located at the center of the above niobium-aluminum precursor wire and the volume percentage of the copper stabilizer contained in the covering body located at the outer periphery of the above niobium-aluminum precursor wire are both set in the above ranges, the mechanical characteristics of the entire niobium-aluminum precursor wire can be balanced, which is a composite of metals such as niobium, aluminum, and copper that have different hardnesses, elongations, and mechanical properties such as work hardening rate and plastic working limit. Therefore, according to the above niobium-aluminum precursor wire, the final wire diameter (specifically, outer diameter) after wire drawing processing can be set to 50 μm or less, and further a single wire length of 1,000 m or more can be secured.

Setting the volume percentage of the copper stabilizer contained in the core located at the center to 30% or more is desirable because the mechanical characteristics of the entire niobium-aluminum precursor wire can be balanced. The copper stabilizer in the center is derived from the core used when an aluminum foil and a niobium foil are wound to overlap each other, but setting the volume percentage of the copper stabilizer in the center to 30% or more is desirable, also from the point of view that the problem that the diameter of the core becomes thinner due to the small amount of copper stabilizer and thus working properties significantly reduce can be preferably avoided.

Also, setting the volume percentage of the copper stabilizer contained in the core located at the center to 70% or less is desirable because the mechanical characteristics of the entire niobium-aluminum precursor wire can be balanced. Specifically, the above setting is desirable because the situation that the copper sheath is easily torn and peeled off during wire drawing processing, which is a cause to induce wire breakage can be avoided. This is because setting the volume percentage of the copper stabilizer in the center to 70% or less means that the volume percentage of the copper stabilizer at the outer periphery is greater than 30%, thereby meaning that a sufficient thickness of the covering body (namely, the thickness of the copper sheath) that is formed of the copper stabilizer or that is formed of the copper stabilizer and the non-copper stabilizer, which is located at the outer periphery of the niobium-aluminum precursor wire can be secured and the problem that the copper sheath has a thinner thickness and is easily torn can be desirably avoided.

The niobium-aluminum precursor wire of an aspect of the present invention includes a layer (this layer is also referred to as a "diffusion barrier layer" in the present application) formed of a substance exhibiting low reactivity to aluminum between the above core and/or the above covering body and the above lamination.

When a niobium-aluminum superconducting wire is manufactured by heat-treating the above niobium-aluminum precursor wire, aluminum of the aluminum foil constituting the above lamination reacts with copper of the above core and/or the above covering body in contact with the aluminum foil, and this may affect the characteristics of the entire niobium-aluminum superconducting wire depending on the reaction amount thereof, and thus the diffusion barrier layer is preferable in terms that such a situation can be prevented.

Hence, the diffusion barrier layer is not particularly limited as long as the objects of the present invention can be achieved if the substance exhibits low reactivity to aluminum and copper to the extent that does not affect the characteristics of the entire niobium-aluminum superconducting wire when a niobium-aluminum superconducting wire is manufactured by heat treatment the above niobium-aluminum precursor wire. Specific examples thereof include niobium and tantalum.

The diffusion barrier layer between the above core and the above lamination and the diffusion barrier layer between the above lamination and the above covering body may be formed of the same material or formed of the different materials as long as the materials are substances exhibiting low reactivity to aluminum and copper.

FIG. 1 exemplarily illustrates a cross-sectional view of a niobium-aluminum precursor wire of an aspect of the present invention. The niobium-aluminum precursor wire of an aspect of the present invention, which is illustrated in FIG. 1, has a structure in which a rod-shaped core 5 that is formed of the copper stabilizer or that is formed of the copper stabilizer and the non-copper stabilizer is located in the center, a lamination 3 that has a structure of overlapping an aluminum foil and a niobium foil each other is located around the core 1 with a diffusion barrier layer 4 such as niobium and tantalum exhibiting low reactivity to aluminum and copper interposed therebetween, and a copper tube 1 serving as a covering body is located at the periphery of the lamination 3 (namely, at the outer periphery of the niobium-aluminum precursor wire) with a diffusion barrier layer 2 such as niobium and tantalum exhibiting low reactivity to aluminum and copper interposed therebetween. The diffusion barrier layers 2 and 4 may be optionally provided.

Figure 2:
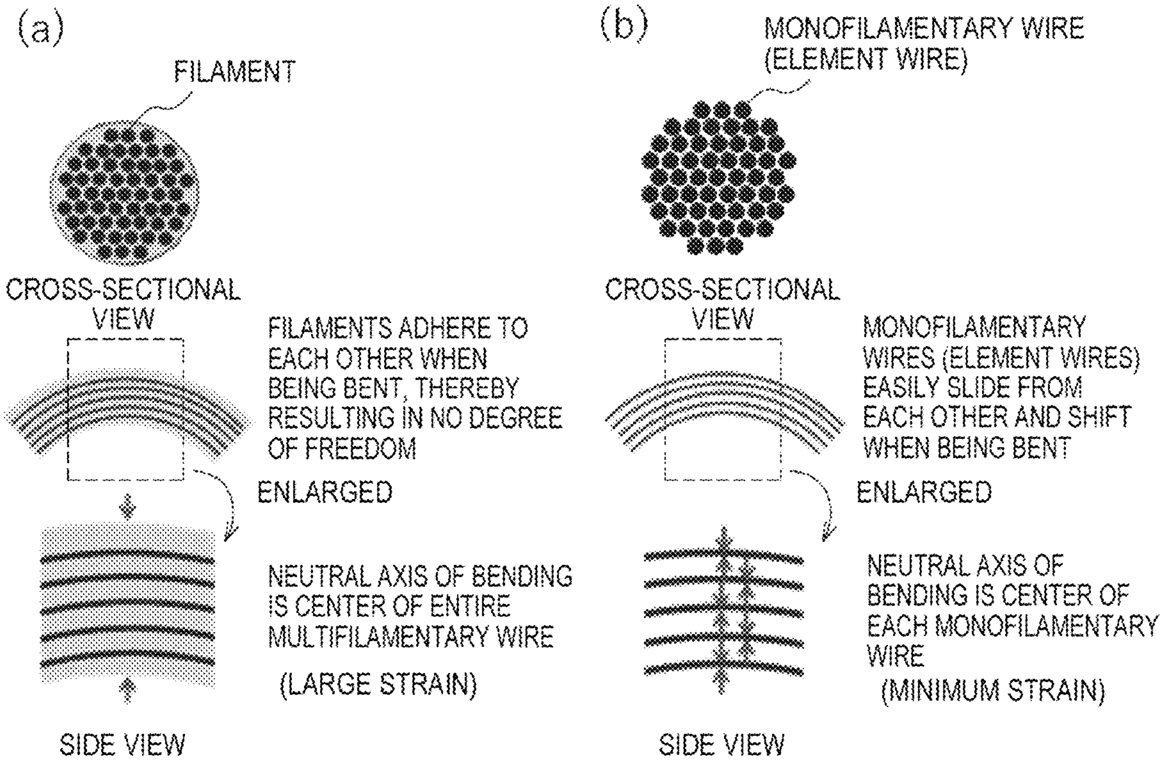
FIG. 2 is cross-sectional views of a representative example of a niobium-aluminum precursor wire of a conventional multifilamentary wire and an example of a niobium-aluminum precursor twisted wire (i.e., first order twisted wire) of an aspect of the present invention, and conceptual diagrams illustrating bending mechanisms of the two wires (here, (a) in the figure is a diagram related to a representative example of a niobium-aluminum precursor wire of a conventional multifilamentary wire, and (b) in the figure is a diagram related to an example of a niobium-aluminum precursor twisted wire (i.e., first order twisted wire) of an aspect of the present invention).

The niobium-aluminum precursor twisted wire of an aspect of the present invention is one first order twisted wire formed by carrying out an operation of bundling and twisting two or more niobium-aluminum precursor wires described above as an aspect of the present invention. A cross-sectional view of the first order twisted wire is illustrated in FIG. 2 in comparison with a cross-sectional view of a representative example of a niobium-aluminum precursor wire of a conventional multifilamentary wire. A representative example of a niobium-aluminum precursor wire of a conventional multifilamentary wire is illustrated in FIG. 2(*a*), and an example of the niobium-aluminum precursor twisted wire (i.e., first order twisted wire) of an aspect of the present invention is illustrated in FIG. 2(*b*).

As illustrated in FIG. 2(*a*), the cross-sectional view of a niobium-aluminum precursor wire of a conventional multifilamentary wire has a structure in which several tens of laminations are bundled and inserted into one pure copper tube, wherein each of the several tens of laminations is wound around a pure copper rod as a core and overlaps a niobium foil and an aluminum foil each other (and optionally includes a diffusion barrier layer between the pure copper rod and the lamination of a niobium foil and an aluminum foil). For convenience, the lamination that is wound around a pure copper rod as a core and that has a structure of overlapping a niobium foil and an aluminum foil each other (and optionally includes a diffusion barrier layer between the pure copper rod and the lamination of a niobium foil and an aluminum foil) is also referred to herein as a "filament".

On the other hand, as illustrated in FIG. 2(*b*), the cross-sectional view of the niobium-aluminum precursor twisted wire of an aspect of the present invention has a structure in which one first order twisted wire is one formed by only carrying out an operation of bundling and twisting two or more (several tens in FIG. 2(*b*)) niobium-aluminum precursor wires (namely, monofilamentary wires), wherein each of the two or more niobium-aluminum precursor wires has a structure of inserting a lamination into one pure copper tube, and wherein the lamination is wound around a pure copper rod as a core and has a structure of overlapping a niobium foil and an aluminum foil each other.

When a niobium-aluminum precursor wire of a conventional multifilamentary wire is bent, the strain applied to the center becomes extremely large because the individual filaments adhere to each other and are integrated as a whole and the neutral axis of bending is at the center of the entire multifilamentary wire, as seen in the conceptual diagram illustrating the bending mechanism in FIG. 2(*a*) even if the wire rod outer diameter of the individual filaments constituting the multifilamentary wire is, for example, 50 μm. Specifically, as described above, the wire rod outer diameter of the niobium-aluminum precursor wire of a conventional multifilamentary wire is about 0.8 to 1.5 mm, so that even in the case where the wire is bent with an extremely small radius of curvature of about several millimeters, the bending strain is 100 or more times larger than the bending strain applied to one filament having a wire rod outer diameter of 0.05 mm (i.e., 50 μm). As a result, when the niobium-aluminum precursor wire of a conventional multifilamentary wire is bent with a radius of curvature of several tens of millimeters, the wire breaks and causes the breakage thereof or its characteristics are deteriorated.

On the other hand, when the niobium-aluminum precursor twisted wire of an aspect of the present invention is bent, even in the case where several tens of niobium-aluminum precursor wires, which are monofilamentary wires, are bundled and twisted to form a niobium-aluminum precursor twisted wire having a large diameter (in other words, an assembly of niobium-aluminum precursor wires), as seen in the conceptual diagram illustrating the bending mechanism in FIG. 2(*b*), the monofilamentary wires (namely, element wires) themselves of the individual niobium-aluminum precursor wires constituting the niobium-aluminum precursor twisted wire are in contact with each other, but do not adhere to each other, and thus each of the monofilamentary wires (i.e., element wires) can easily slide in the entire niobium-aluminum precursor twisted wire (in other words, assembly of niobium-aluminum precursor wires). Therefore, even in the case where a niobium-aluminum precursor twisted wire (in other words, assembly of niobium-aluminum precursor wires) is formed, the neutral axis of bending is approximately at the center of each monofilamentary wire (i.e., element wire) and does not change. As a result, according to the niobium-aluminum precursor twisted wire of an aspect of the present invention, bendability (so-called "flexibility") comes to be maintained, which is different from the niobium-aluminum precursor wire of a conventional multifilamentary wire. In particular, in the case where the wire rod outer diameter of monofilamentary wire (i.e., element wire) of the niobium-aluminum precursor wire is as ultra fine as 50 μm or less, which is thinner than a hair, bendability (so-called "flexibility") comes to be largely maintained.

The "niobium-aluminum precursor twisted wire" of an aspect of the present invention is also a niobium-aluminum precursor twisted wire formed, as one second order twisted wire, by carrying out, one time, an operation of bundling and twisting two or more niobium-aluminum precursor twisted wires. Here, the niobium-aluminum precursor twisted wire used in the above bundling and twisting operation, namely the bundling and twisting operation carried out for the first time is the niobium-aluminum precursor twisted wire (i.e., first order twisted wire) described above as an aspect of the present invention.

Figure 3:
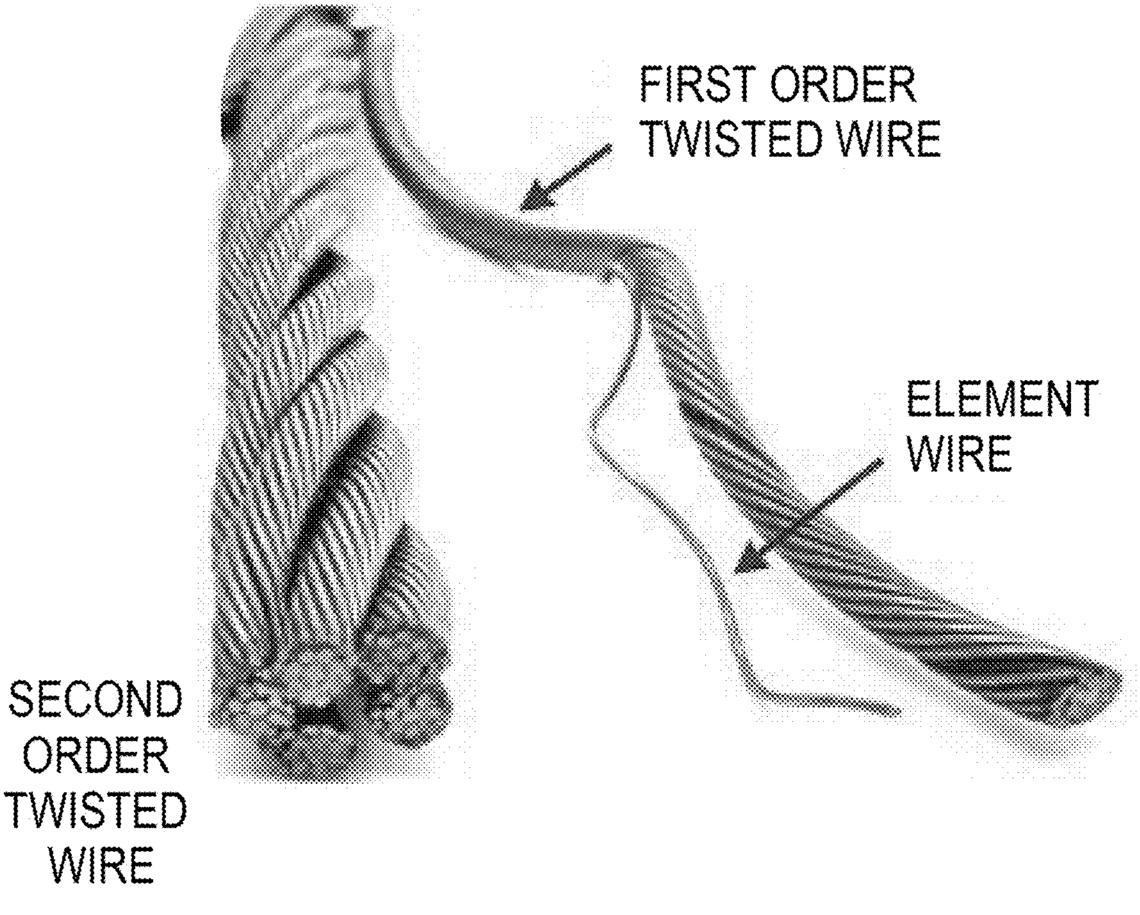
FIG. 3 is a diagram illustrating an example of the structure of a niobium-aluminum precursor twisted wire (i.e., second order twisted wire) of an aspect of the present invention.

FIG. 3 illustrates an example of the structure of the niobium-aluminum precursor twisted wire (i.e., second order twisted wire) of an aspect of the present invention. FIG. 3 illustrates, as the niobium-aluminum precursor twisted wire (i.e., second order twisted wire) of the present invention, a structure of one second order twisted wire formed by the following processes: carrying out an operation of bundling and twisting two or more element wires (specifically, each of which is the niobium-aluminum precursor wire described above as an aspect of the present invention) to form one first order twisted wire; and then carrying out an operation of bundling and twisting two or more first order twisted wires, wherein each of the two or more first order twisted wires is the above one first order twisted wire formed by carrying out the above bundling and twisting operation.

The "niobium-aluminum precursor twisted wire" of an aspect of the present invention is also a niobium-aluminum precursor twisted wire formed as one third order twisted wire by carrying out, two times, an operation of bundling and twisting two or more niobium-aluminum precursor twisted wires, wherein the niobium-aluminum precursor twisted wire of the one third order twisted wire manufactured by the bundling and twisting operation carried out for the second time is manufactured by carrying out an operation of bundling and twisting two or more niobium-aluminum precursor twisted wires, wherein each of the two or more niobium-aluminum precursor twisted wires is one manufactured by the bundling and twisting operation carried out for the first time Here, each of two or more niobium-aluminum precursor twisted wires used in the bundling and twisting operation carried out for the first time is the niobium-aluminum precursor twisted wire (i.e., first order twisted wire) described above as an aspect of the present invention.

Figure 4:
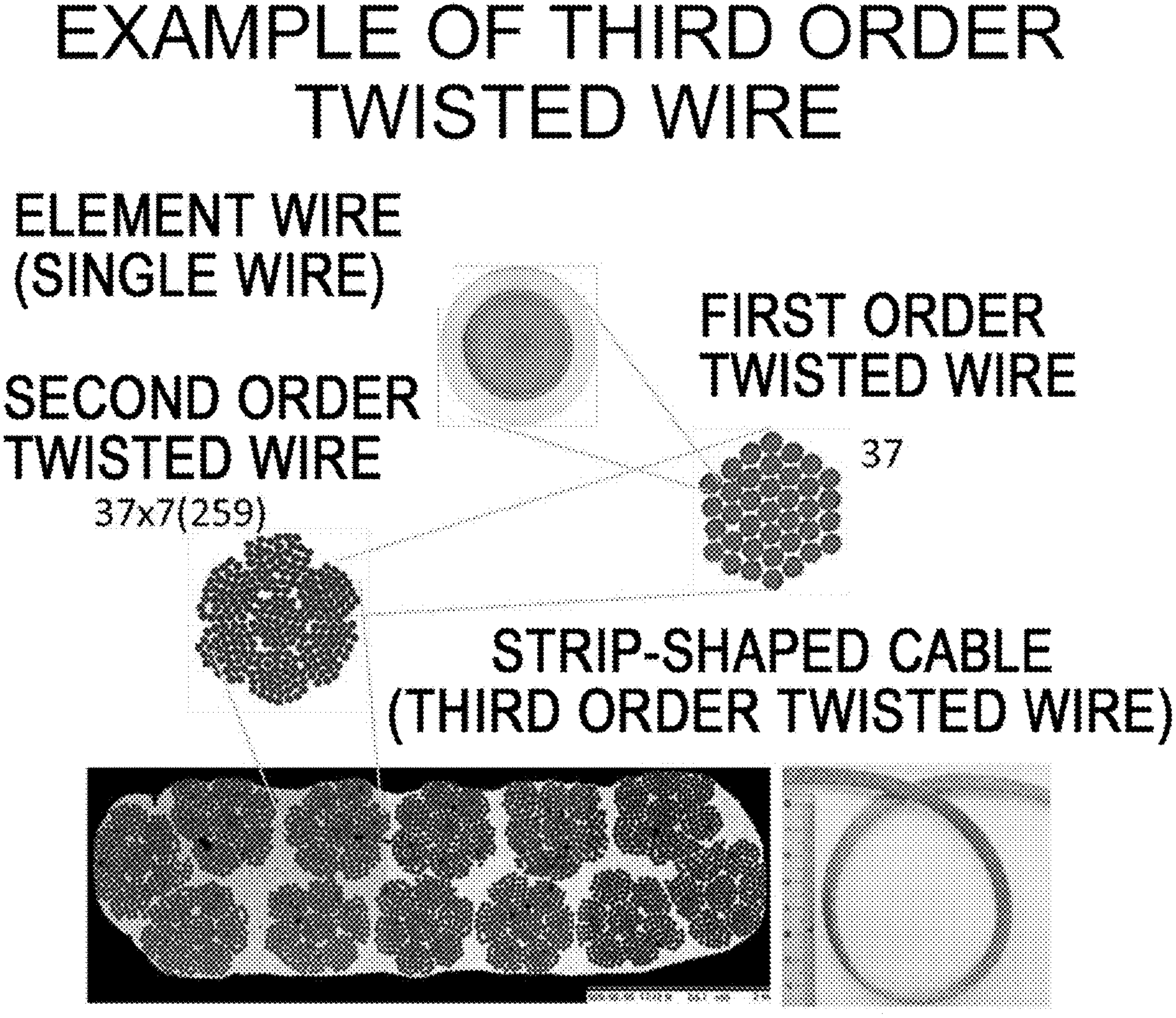
FIG. 4 is a diagram illustrating an example of the cross-sectional structure of a niobium-aluminum precursor twisted wire (i.e., third order twisted wire) of an aspect of the present invention.

FIG. 4 illustrates an example of the cross-sectional structure of the niobium-aluminum precursor wire (i.e., third order twisted wire) of an aspect of the present invention. FIG. 4 illustrates, as the niobium-aluminum precursor twisted wire (i.e., third order twisted wire) of an aspect of the present invention, a structure in which one third order twisted wire is a strip-shaped cable, wherein the one third order twisted wire is one formed by the following processes: carrying out an operation of bundling and twisting 37 element wires (specifically, each of which is the niobium-aluminum precursor wire described above as an aspect of the present invention) to form one first order twisted wire: carrying out an operation of bundling and twisting 7 first order twisted wires to form one second order twisted wire, wherein each of the 7 first order twisted wires is one formed by carrying out the above operation of bundling and twisting the 37 element wires; and then carrying out an operation of bundling and twisting 12 second order twisted wires to form one third order twisted wire, wherein each of the 12 second order twisted wires is one formed by the above operation of bundling and twisting the 7 first order twisted wires.

The "niobium-aluminum precursor twisted wire" of an aspect of the present invention is also a niobium-aluminum precursor twisted wire, which is an (n+1) order twisted wire formed by carrying out, n times (wherein the n is an integer 3 or more), an operation of bundling and twisting two or more niobium-aluminum precursor twisted wires to form one twisted wire, wherein a niobium-aluminum precursor twisted wire manufactured by the bundling and twisting operation carried out at each time after a second time is one manufactured by carrying out the above operation of bundling and twisting two or more niobium-aluminum precursor twisted wires, wherein each of the two or more niobium-aluminum precursor twisted wires is one manufactured by carrying out the bundling and twisting operation one before manufacturing the each of the two or more niobium-aluminum precursor twisted wires. Here, each of two or more niobium-aluminum precursor twisted wires used in the bundling and twisting operation carried out for the first time is the niobium-aluminum precursor twisted wire (i.e., first order twisted wire) described above as an aspect of the present invention. As such, a high order twisted wire of a fourth or more order twisted wire can be, if necessary, manufactured by repeatedly carrying out an operation of bundling and twisting two or more niobium-aluminum precursor twisted wires to form one twisted wire.

Figure 5:
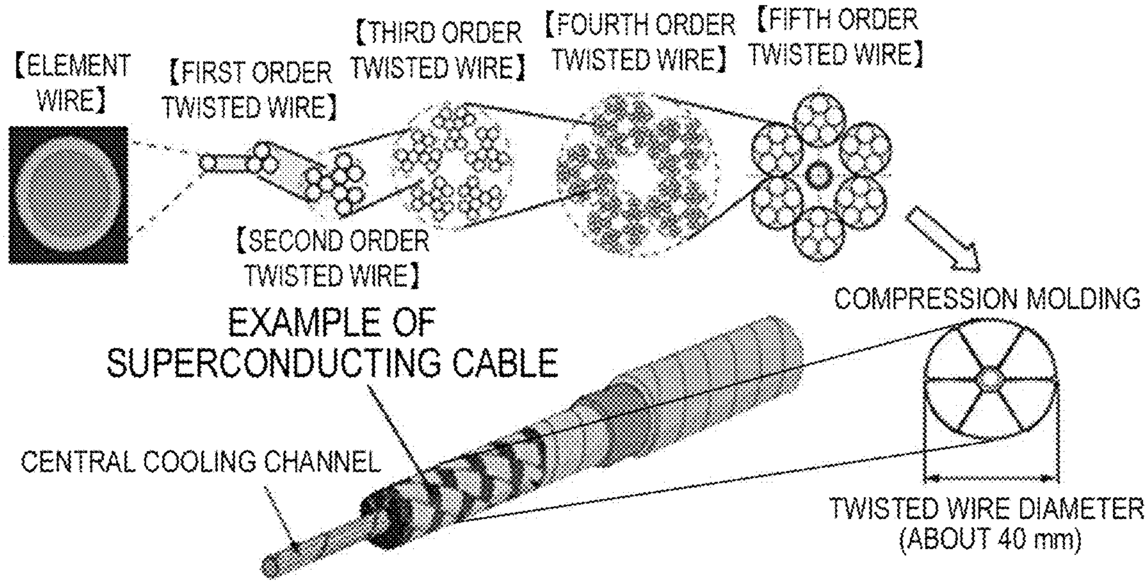
FIG. 5 is a diagram illustrating an example of the cross-sectional structure of a niobium-aluminum precursor twisted wire (i.e., fifth order twisted wire) of an aspect of the present invention, and an example of a superconducting cable formed by using the fifth order twisted wire.

FIG. 5 illustrates an example of the cross-sectional structure of a fifth order twisted wire taken as an example of a high order niobium-aluminum precursor twisted wire of an aspect of the present invention, and an example of a superconducting cable formed by using the fifth order twisted wire. FIG. 5 illustrates that 3 element wires (specifically, each of which is the niobium-aluminum precursor wire described above as an aspect of the present invention) are bundled and twisted to form one first order twisted wire; 3 first order twisted wires are bundled and twisted to form one second order twisted wire, wherein each of the 3 first order twisted wires is one formed by carrying out the above operation of bundling and twisting the 3 element wires to form one first order twisted wire; 5 second order twisted wires are bundled and twisted to form one third order twisted wire, wherein each of the 5 second order twisted wires is one formed by carrying out the above operation of bundling and twisting the 3 first order twisted wires to form one second order twisted wire; 5 third order twisted wires are bundled and twisted to form one fourth order twisted wire, wherein each of the 5 third order twisted wires is one formed by carrying out the above operation of bundling and twisting the 5 second order twisted wires to form one third order twisted wire; a cooling channel is disposed in the center; and 6 fourth order twisted wires are bundled and twisted to form one fifth order twisted wire, wherein each of the 6 fourth order twisted wires is one formed by carrying out the above operation of bundling and twisting the 5 third order twisted wires to form one fourth order twisted wire by using each of their cross-sectional views, and that a superconducting cable having a wire rod outer diameter (twisted wire diameter) of about 40 mm can be formed by compression molding the fifth order twisted wire.

The niobium-aluminum superconducting wire of an aspect of the present invention has a superconducting phase imparted by heat-treating the niobium-aluminum precursor wire described above as an aspect of the present invention. It is preferable that the superconducting phase includes a phase represented by $Nb_3Al$. For the above heat treatment, a known heat treatment process that is adopted when a niobium-aluminum precursor wire is converted into a superconducting wire has only to be applied. Specifically, for example, the niobium-aluminum precursor wire has only to be maintained at any temperature less than the melting point of pure copper (1,085° C.) for several minutes to several hundred hours in a vacuum ($10^{-2}$ Pa or less) or in an atmosphere of non-oxidizing inert gas (argon gas, nitrogen gas, or the like), and cooled in the furnace.

The niobium-aluminum superconducting twisted wire of an aspect of the present invention has a superconducting phase imparted by heat-treating the niobium-aluminum precursor twisted wire described above as an aspect of the present invention. It is preferable that the superconducting phase includes a phase represented by $NB_3Al$. For the above heat treatment, a known heat treatment process that is adopted when a niobium-aluminum precursor wire is converted into a superconducting wire has only to be applied. Specifically, for example, the niobium-aluminum precursor wire has only to be maintained at any temperature less than the melting point of pure copper (1,085° C.) for several minutes to several hundred hours in a vacuum ($10^{-2}$ Pa or less) or in an atmosphere of non-oxidizing inert gas (argon gas, nitrogen gas, or the like), and cooled in the furnace.

Conditions that are not specified in the present application are not particularly limited as long as the objects of the present invention can be achieved.

EXAMPLES

Next, embodiments of the present invention will be described in more detail with reference to "Examples" and "Comparative Examples", but the embodiments of the present invention are not limited to the following examples as long as the gist thereof is not exceeded.

Manufacture of Niobium-Aluminum Precursor Wire and Evaluation of its Characteristics The examples for the manufacture of niobium-aluminum precursor wires are illustrated in "Examples 1 to 14". The examples of "Examples 5 to 7" and "Examples 11 to 14" correspond to the examples for the manufacture of niobium-aluminum precursor wires, which are illustrated as an aspect of the present invention, so-called "Examples". And the other examples correspond to the examples for the manufacture of niobium-aluminum precursor wires, which do not belong to the aspects of the present invention, so-called "Comparative Examples".

Example 1

Figure 6:
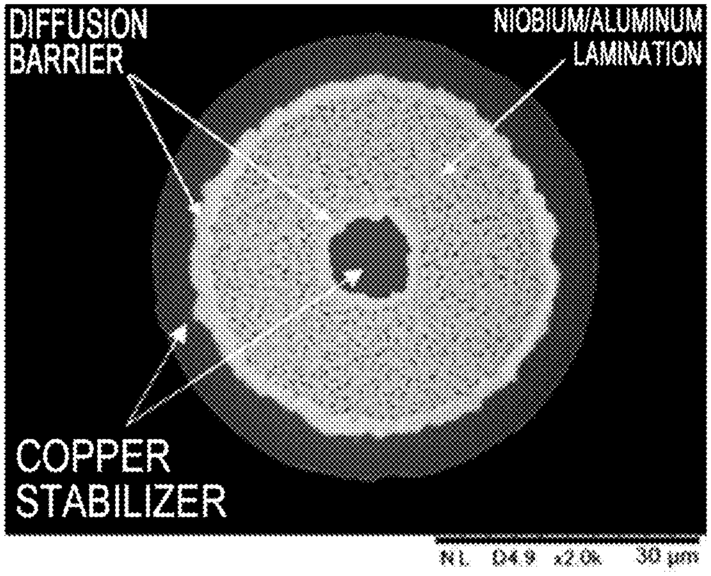
FIG. 6 is a SEM image illustrating a cross section of a niobium-aluminum precursor wire rod manufactured in Example 1 of the Examples.

A lamination was manufactured by winding a pure niobium foil having 0.1 mm thickness and a pure aluminum foil having 0.03 mm thickness around a pure copper core having a diameter of 2.0 mm in the following manners: winding only the pure niobium foil around the core with the required number of turns at the winding start, thereby forming an inner diffusion barrier layer; then winding the pure niobium foil and the pure aluminum foil to overlap each other, and forming a $Nb_3Al$ phase in the case where the reaction of the pure niobium foil and the pure aluminum foil occurs; and again winding only the pure niobium foil with the required number of turns at the winding end, thereby forming an outer diffusion barrier layer. The manufactured lamination was inserted into a pure copper tube having an outer diameter of 12.3 mm and an inner diameter of 10.1 mm, and subjected to cold extrusion processing, and drawing processing by means of a carbide die and a diamond die, thereby obtaining a niobium-aluminum precursor wire having an outer diameter after final wire drawing processing (this outer diameter is referred to as a "final wire diameter" in the present application) of 0.05 mm and a single wire length of 126 m. The volume ratio of the pure copper (namely, copper stabilizer) to the non-pure copper (namely, non-copper stabilizer) in the obtained niobium-aluminum precursor wire was 0.5. And the volume percentage of the pure copper (namely, copper stabilizer) in the above core located in the center was 7.5% with respect to the total volume of the pure copper in the above core and the pure copper (namely, copper stabilizer) in the pure copper tube. In other words, the proportion of the pure copper (namely, copper stabilizer) in the pure copper tube located at the outer periphery was 92.5%. FIG. 6 illustrates a cross-sectional view of the niobium-aluminum precursor wire having a final wire diameter of 0.05 mm, manufactured in this example. This cross-sectional view is the result of measurement by means of a tabletop electron microscope instrument (model: TM3030Plus) manufactured by Hitachi, Ltd. under the conditions for backscattered electron image observation.

Example 2

Figure 7:
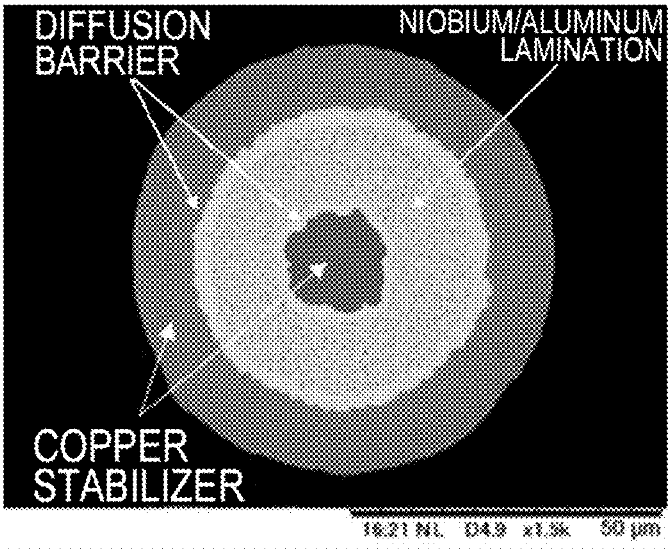
FIG. 7 is a SEM image illustrating a cross section of a niobium-aluminum precursor wire rod manufactured in Example 2 of the Examples.

A lamination was manufactured by winding a pure niobium foil having 0.1 mm thickness and a pure aluminum foil having 0.03 mm thickness around a pure copper core having a diameter of 2.0 mm in the following manners: winding only the pure niobium foil around the core with the required number of turns at the winding start, thereby forming an inner diffusion barrier layer; then winding the pure niobium foil and the pure aluminum foil to overlap each other, and forming a $Nb_3Al$ phase in the case where the reaction of the pure niobium foil and the pure aluminum foil occurs; and again winding only the pure niobium foil with the required number of turns at the winding end, thereby forming an outer diffusion barrier layer. The manufactured lamination was inserted into a pure copper tube having an outer diameter of 14.0 mm and an inner diameter of 10.1 mm, and subjected to cold extrusion processing, and drawing processing by means of a carbide die and a diamond die, thereby obtaining a niobium-aluminum precursor wire having a final wire diameter of 0.183 mm and a single wire length of 566 m. The volume ratio of the pure copper (namely, copper stabilizer) to the non-pure copper (namely, non-copper stabilizer) in the obtained niobium-aluminum precursor wire was 1.0. And the volume percentage of the pure copper (namely, copper stabilizer) in the above core located in the center was 4.1% with respect to the total volume of the pure copper in the above core and the pure copper (namely, copper stabilizer) in the pure copper tube. In other words, the proportion of the pure copper (namely, copper stabilizer) in the pure copper tube located at the outer periphery was 95.9%. FIG. 7 illustrates a cross-sectional view of the niobium-aluminum precursor wire having a final wire diameter of 0.183 mm manufactured in this example. This cross-sectional view is the result of measurement by means of a tabletop electron microscope instrument (model: TM3030Plus) manufactured by Hitachi, Ltd. under the conditions for backscattered electron image observation.

Example 3

Figure 8:
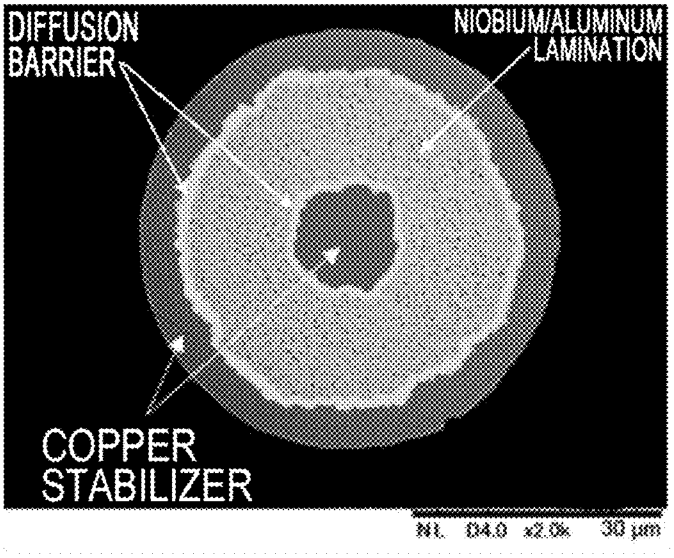
FIG. 8 is a SEM image illustrating a cross section of a niobium-aluminum precursor wire rod manufactured in Example 3 of the Examples.

A lamination was manufactured by winding a pure niobium foil having 0.1 mm thickness and a pure aluminum foil having 0.03 mm thickness around a pure copper core having a diameter of 3.0 mm in the following manners: winding only the pure niobium foil around the core with the required number of turns at the winding start, thereby forming an inner diffusion barrier layer; then winding the pure niobium foil and the pure aluminum foil to overlap each other, and forming a $Nb_3Al$ phase in the case where the reaction of the pure niobium foil and the pure aluminum foil occurs; and again winding only the pure niobium foil with the required number of turns at the winding end, thereby forming an outer diffusion barrier layer. The manufactured lamination was inserted into a pure copper tube having an outer diameter of 12.3 mm and an inner diameter of 10.1 mm, and subjected to cold extrusion processing, and drawing processing by means of a carbide die and a diamond die, thereby obtaining a niobium-aluminum precursor wire having a final wire diameter of 0.05 mm and a single wire length of 455 m. The volume ratio of the pure copper (namely, copper stabilizer) to the non-pure copper (namely, non-copper stabilizer) in the obtained niobium-aluminum precursor wire was 0.6. And the volume percentage of the pure copper (namely, copper stabilizer) in the above core located in the center was 15.4% with respect to the total volume of the pure copper in the above core and the pure copper (namely, copper stabilizer) in the pure copper tube. In other words, the proportion of the pure copper (namely, copper stabilizer) in the pure copper tube located at the outer periphery was 84.6%. FIG. 8 illustrates a cross-sectional view of the niobium-aluminum precursor wire having a final wire diameter of 0.05 mm manufactured in this example. This cross-sectional view is the result of measurement by means of a tabletop electron microscope instrument (model: TM3030Plus) manufactured by Hitachi, Ltd. under the conditions for backscattered electron image observation.

Example 4

Figure 9:
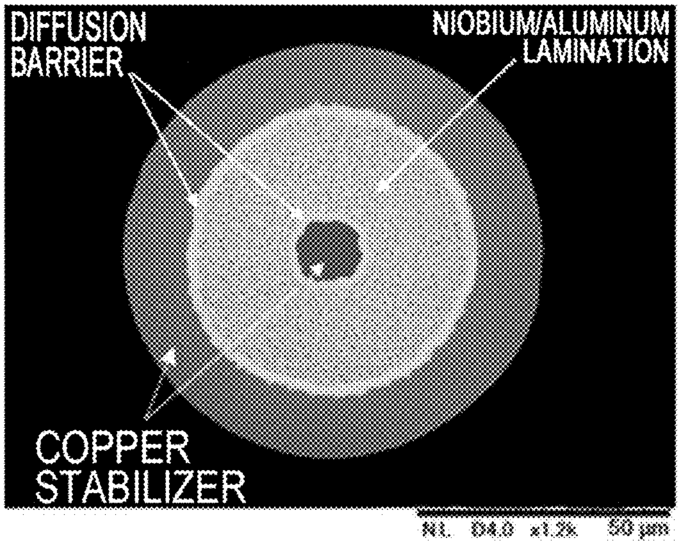
FIG. 9 is a SEM image illustrating a cross section of a niobium-aluminum precursor wire rod manufactured in Example 4 of the Examples.

A lamination was manufactured by winding a pure niobium foil having 0.1 mm thickness and a pure aluminum foil having 0.03 mm thickness around a pure copper core having a diameter of 3.0 mm in the following manners: winding only the pure niobium foil around the core with the required number of turns at the winding start, thereby forming an inner diffusion barrier layer; then winding the pure niobium foil and the pure aluminum foil to overlap each other, and forming a $Nb_3Al$ phase in the case where the reaction of the pure niobium foil and the pure aluminum foil occurs; and again winding only the pure niobium foil with the required number of turns at the winding end, thereby forming an outer diffusion barrier layer. The manufactured lamination was inserted into a pure copper tube having an outer diameter of 14.0 mm and an inner diameter of 10.1 mm, and subjected to cold extrusion processing, and drawing processing by means of a carbide die and a diamond die, thereby obtaining a niobium-aluminum precursor wire having a final wire diameter of 0.067 mm and a single wire length of 233 m. The volume ratio of the pure copper (namely, copper stabilizer) to the non-pure copper (namely, non-copper stabilizer) in the obtained niobium-aluminum precursor wire was 1.1. And the volume percentage of the pure copper (namely, copper stabilizer) in the above core located in the center was 8.7% with respect to the total volume of the pure copper in the above core and the pure copper (namely, copper stabilizer) in the pure copper tube. In other words, the proportion of the pure copper (namely, copper stabilizer) in the pure copper tube located at the outer periphery was 91.3%. FIG. 9 illustrates a cross-sectional view of the niobium-aluminum precursor wire having a final wire diameter of 0.067 mm manufactured in this example. This cross-sectional view is the result of measurement by means of a tabletop electron microscope instrument (model: TM3030Plus) manufactured by Hitachi, Ltd. under the conditions for backscattered electron image observation.

Example 5

Figure 10:
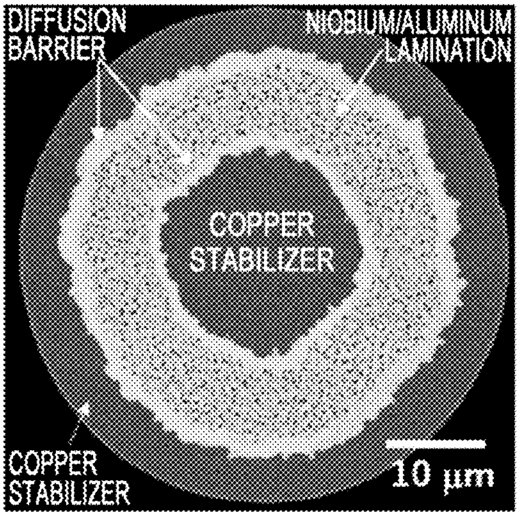
FIG. 10 is a SEM image illustrating a cross section of a niobium-aluminum precursor wire rod manufactured in Example 5 of the Examples.

A lamination was manufactured by winding a pure niobium foil having 0.1 mm thickness and a pure aluminum foil having 0.03 mm thickness around a pure copper core having a diameter of 5.0 mm in the following manners: winding only the pure niobium foil around the core with the required number of turns at the winding start, thereby forming an inner diffusion barrier layer; then winding the pure niobium foil and the pure aluminum foil to overlap each other, and forming a $Nb_3Al$ phase in the case where the reaction of the pure niobium foil and the pure aluminum foil occurs; and again winding only the pure niobium foil with the required number of turns at the winding end, thereby forming an outer diffusion barrier layer. The manufactured lamination was inserted into a pure copper tube having an outer diameter of 12.3 mm and an inner diameter of 10.1 mm, and s subjected to cold extrusion processing, and drawing processing by means of a carbide die and a diamond die, thereby obtaining a niobium-aluminum precursor wire having a final wire diameter of 0.05 mm and a single wire length of 2063 m. The volume ratio of the pure copper (namely, copper stabilizer) to the non-pure copper (namely, non-copper stabilizer) in the obtained niobium-aluminum precursor wire was 1.0. And the volume percentage of the pure copper (namely, copper stabilizer) in the above core located in the center was 33.7% with respect to the total volume of the pure copper in the above core and the pure copper (namely, copper stabilizer) in the pure copper tube. In other words, the proportion of the pure copper (namely, copper stabilizer) in the pure copper tube located at the outer periphery was 66.3%. FIG. 10 illustrates a cross-sectional view of the niobium-aluminum precursor wire having a final wire diameter of 0.05 mm manufactured in this example. This cross-sectional view is the result of measurement by means of a tabletop electron microscope instrument (model: TM3030Plus) manufactured by Hitachi, Ltd. under the conditions for backscattered electron image observation.

It has been confirmed that according to this example, which is an embodiment of the present invention, a niobium-aluminum precursor wire having a final wire diameter of 0.05 mm and a single wire length of 1,000 m or more can be obtained.

Example 6

Figure 11:
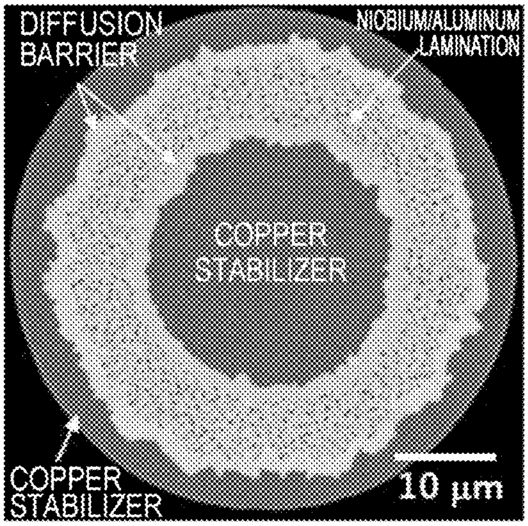
FIG. 11 is a SEM image illustrating a cross section of a niobium-aluminum precursor wire rod manufactured in Example 6 of the Examples.

A lamination was manufactured by winding a pure niobium foil having 0.1 mm thickness and a pure aluminum foil having 0.03 mm thickness around a pure copper core having a diameter of 6.0 mm in the following manners: winding only the pure niobium foil around the core with the required number of turns at the winding start, thereby forming an inner diffusion barrier layer; then winding the pure niobium foil and the pure aluminum foil to overlap each other, and forming a $NB_3Al$ phase in the case where the reaction of the pure niobium foil and the pure aluminum foil occurs; and again winding only the pure niobium foil with the required number of turns at the winding end, thereby forming an outer diffusion barrier layer. The manufactured lamination was inserted into a pure copper tube having an outer diameter of 12.3 mm and an inner diameter of 10.6 mm, and subjected to cold extrusion processing, and drawing processing by means of a carbide die and a diamond die, thereby obtaining a niobium-aluminum precursor wire having a final wire diameter of 0.05 mm and a single wire length of 1313 m. The volume ratio of the pure copper (namely, copper stabilizer) to the non-pure copper (namely, non-copper stabilizer) in the obtained niobium-aluminum precursor wire was 1.0. And the volume percentage of the pure copper (namely, copper stabilizer) in the above core located in the center was 48.0% with respect to the total volume of the pure copper in the above core and the pure copper (namely, copper stabilizer) in the pure copper tube. In other words, the proportion of the pure copper (namely, copper stabilizer) in the pure copper tube located at the outer periphery was 52.0%. FIG. 11 illustrates a cross-sectional view of the niobium-aluminum precursor wire having a final wire diameter of 0.05 mm manufactured in this example. This cross-sectional view is the result of measurement by means of a tabletop electron microscope instrument (model: TM3030Plus) manufactured by Hitachi, Ltd. under the conditions for backscattered electron image observation.

It has been confirmed that according to this example, which is an embodiment of the present invention, a niobium-aluminum precursor wire having a final wire diameter of 0.05 mm and a single wire length of 1,000 m or more can be obtained.

Example 7

Figure 12:
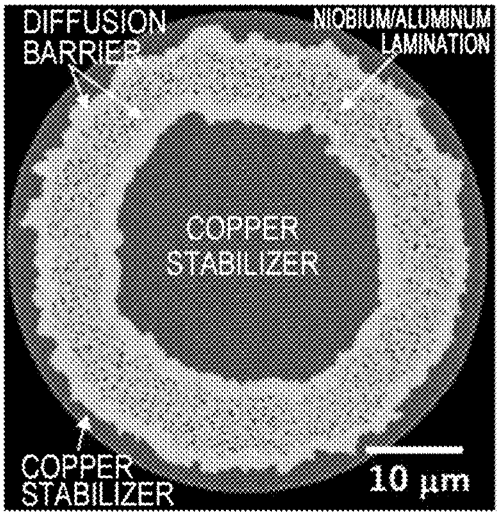
FIG. 12 is a SEM image illustrating a cross section of a niobium-aluminum precursor wire rod manufactured in Example 7 of the Examples.

A lamination was manufactured by winding a pure niobium foil having 0.1 mm thickness and a pure aluminum foil having 0.03 mm thickness around a pure copper core having a diameter of 7.0 mm in the following manners: winding only the pure niobium foil around the core with the required number of turns at the winding start, thereby forming an inner diffusion barrier layer; then winding the pure niobium foil and the pure aluminum foil to overlap each other, and forming a $Nb_3Al$ phase in the case where the reaction of the pure niobium foil and the pure aluminum foil occurs; and again winding only the pure niobium foil with the required number of turns at the winding end, thereby forming an outer diffusion barrier layer. The manufactured lamination was inserted into a pure copper tube having an outer diameter of 12.3 mm and an inner diameter of 11.2 mm, and subjected to cold extrusion processing, and drawing processing by means of a carbide die and a diamond die, thereby obtaining a niobium-aluminum precursor wire having a final wire diameter of 0.05 mm and a single wire length of 1466 m. The volume ratio of the pure copper (namely, copper stabilizer) to the non-pure copper (namely, non-copper stabilizer) in the obtained niobium-aluminum precursor wire was 1.0. And the volume percentage of the pure copper (namely, copper stabilizer) in the above core located in the center was 65.5% with respect to the total volume of the pure copper in the above core and the pure copper (namely, copper stabilizer) in the pure copper tube. In other words, the proportion of the pure copper (namely, copper stabilizer) in the pure copper tube located at the outer periphery was 34.5%. FIG. 12 illustrates a cross-sectional view of the niobium-aluminum precursor wire having a final wire diameter of 0.05 mm manufactured in this example. This cross-sectional view is the result of measurement by means of a tabletop electron microscope instrument (model: TM3030Plus) manufactured by Hitachi, Ltd. under the conditions for backscattered electron image observation.

It has been confirmed that according to this example, which is an embodiment of the present invention, a niobium-aluminum precursor wire having a final wire diameter of 0.05 mm and a single wire length of 1,000 m or more can be obtained.

Example 8

A lamination was manufactured by winding a pure niobium foil having 0.1 mm thickness and a pure aluminum foil having 0.03 mm thickness around a pure copper core having a diameter of 6.0 mm in the following manners: winding only the pure niobium foil around the core with the required number of turns at the winding start, thereby forming an inner diffusion barrier layer; then winding the pure niobium foil and the pure aluminum foil to overlap each other, and forming a $Nb_3Al$ phase in the case where the reaction of the pure niobium foil and the pure aluminum foil occurs; and again winding only the pure niobium foil with the required number of turns at the winding end, thereby forming an outer diffusion barrier layer. The manufactured lamination was inserted into a pure copper tube having an outer diameter of 14.0 mm and an inner diameter of 10.1 mm, and subjected to cold extrusion processing, and drawing processing by means of a carbide die and a diamond die, thereby obtaining a niobium-aluminum precursor wire having a final wire diameter of 0.07 mm and a single wire length of 134 m. The volume ratio of the pure copper (namely, copper stabilizer) to the non-pure copper (namely, non-copper stabilizer) in the obtained niobium-aluminum precursor wire was 2.0. And the volume percentage of the pure copper (namely, copper stabilizer) in the above core located in the center was 72.3% with respect to the total volume of the pure copper in the above core and the pure copper (namely, copper stabilizer) in the pure copper tube. In other words, the proportion of the pure copper (namely, copper stabilizer) in the pure copper tube located at the outer periphery was 27.7%.

Example 9

A lamination was manufactured by winding a pure niobium foil having 0.1 mm thickness and a pure aluminum foil having 0.03 mm thickness around a pure copper core having a diameter of 9.0 mm in the following manners: winding only the pure niobium foil around the core with the required number of turns at the winding start, thereby forming an inner diffusion barrier layer; then winding the pure niobium foil and the pure aluminum foil to overlap each other, and forming a $Nb_3Al$ phase in the case where the reaction of the pure niobium foil and the pure aluminum foil occurs; and again winding only the pure niobium foil with the required number of turns at the winding end, thereby forming an outer diffusion barrier layer. The manufactured lamination was inserted into a pure copper tube having an outer diameter of 14.0 mm and an inner diameter of 13.0 mm, and subjected to cold extrusion processing, and drawing processing by means of a carbide die and a diamond die, thereby obtaining a niobium-aluminum precursor wire having a final wire diameter of 0.12 mm and a single wire length of 30 m. The volume ratio of the pure copper (namely, copper stabilizer) to the non-pure copper (namely, non-copper stabilizer) in the obtained niobium-aluminum precursor wire was 1.2. And the volume percentage of the pure copper (namely, copper stabilizer) in the above core located in the center was 75.0% with respect to the total volume of the pure copper in the above core and the pure copper (namely, copper stabilizer) in the pure copper tube. In other words, the proportion of the pure copper contained in the pure copper tube (namely, outer sheath) located at the outer periphery was as low as 25.0%. Since the pure copper outer sheath was so thin, the copper frequently was torn and thus peeled off on the way of the processing.

Example 10

A lamination was manufactured by winding a pure niobium foil having 0.1 mm thickness and a pure aluminum foil having 0.03 mm thickness around a pure copper core having a diameter of 10.0 mm in the following manners; winding only the pure niobium foil around the core with the required number of turns at the winding start, thereby forming an inner diffusion barrier layer; then winding the pure niobium foil and the pure aluminum foil to overlap each other, and forming a $Nb_3Al$ phase in the case where the reaction of the pure niobium foil and the pure aluminum foil occurs; and again winding only the pure niobium foil with the required number of turns at the winding end, thereby forming an outer diffusion barrier layer. The manufactured lamination was inserted into a pure copper tube having an outer diameter of 14.0 mm and an inner diameter of 13.6 mm, and subjected to cold extrusion processing, and drawing processing by means of a carbide die and a diamond die, thereby obtaining a niobium-aluminum precursor wire having a final wire diameter of 0.2 mm and a single wire length of 10 m. The volume ratio of the pure copper (namely, copper stabilizer) to the non-pure copper (namely, non-copper stabilizer) in the obtained niobium-aluminum precursor wire was 1.3. And the volume percentage of the pure copper (namely, copper stabilizer) in the above core located in the center was 90.1% with respect to the total volume of the pure copper in the above core and the pure copper (namely, copper stabilizer) in the pure copper tube. In other words, the proportion of the pure copper contained in the pure copper tube (namely, outer sheath) located at the outer periphery was as quite low as 9.9%. Therefore, the pure copper outer sheath was far thinner than in Example 9, and the copper peeled off and the wire breakage occurred at a high level on the way of the processing.

Example 11

A lamination was manufactured by winding a pure niobium foil having 0.1 mm thickness and a pure aluminum foil having 0.03 mm thickness around a pure copper core having a diameter of 4.0 mm in the following manners: winding only the pure niobium foil around the core with the required number of turns at the winding start, thereby forming an inner diffusion barrier layer; then winding the pure niobium foil and the pure aluminum foil to overlap each other, and forming a $Nb_3Al$ phase in the case where the reaction of the pure niobium foil and the pure aluminum foil occurs; and again winding only the pure niobium foil with the required number of turns at the winding end, thereby forming an outer diffusion barrier layer. The manufactured lamination was inserted into a pure copper tube having an outer diameter of 12.3 mm and an inner diameter of 10.8 mm, and subjected to cold extrusion processing, and drawing processing by means of a carbide die and a diamond die, thereby obtaining a niobium-aluminum precursor wire having a final wire diameter of 0.05 mm and a single wire length of 2015 m. The volume ratio of the pure copper (namely, copper stabilizer) to the non-pure copper (namely, non-copper stabilizer) in the obtained niobium-aluminum precursor wire was 0.5. And the volume percentage of the pure copper (namely, copper stabilizer) in the above core located in the center was 31.6% with respect to the total volume of the pure copper in the above core and the pure copper (namely, copper stabilizer) in the pure copper tube. In other words, the proportion of the pure copper (namely, copper stabilizer) in the pure copper tube located at the outer periphery was 68.4%.

It has been confirmed that according to this example, which is an embodiment of the present invention, a niobium-aluminum precursor wire having a final wire diameter of 0.05 mm and a single wire length of 1,000 m or more can be obtained.

Example 12

A lamination was manufactured by winding a pure niobium foil having 0.1 mm thickness and a pure aluminum foil having 0.03 mm thickness around a pure copper core having a diameter of 5.0 mm in the following manners: winding only the pure niobium foil around the core with the required number of turns at the winding start, thereby forming an inner diffusion barrier layer; then winding the pure niobium foil and the pure aluminum foil to overlap each other, and forming a $Nb_3Al$ phase in the case where the reaction of the pure niobium foil and the pure aluminum foil occurs; and again winding only the pure niobium foil with the required number of turns at the winding end, thereby forming an outer diffusion barrier layer. The manufactured lamination was inserted into a pure copper tube having an outer diameter of 12.3 mm and an inner diameter of 10.8 mm, and subjected to cold extrusion processing, and drawing processing by means of a carbide die and a diamond die, thereby obtaining a niobium-aluminum precursor wire having a final wire diameter of 0.05 mm and a single wire length of 1957 m. The volume ratio of the pure copper (namely, copper stabilizer) to the non-pure copper (namely, non-copper stabilizer) in the obtained niobium-aluminum precursor wire was 0.7. And the volume percentage of the pure copper (namely, copper stabilizer) in the above core located in the center was 41.9% with respect to the total volume of the pure copper in the above core and the pure copper (namely, copper stabilizer) in the pure copper tube. In other words, the proportion of the pure copper (namely, copper stabilizer) in the pure copper tube located at the outer periphery was 58.1%.

It has been confirmed that according to this example, which is an embodiment of the present invention, a niobium-aluminum precursor wire having a final wire diameter of 0.05 mm and a single wire length of 1,000 m or more can be obtained.

Example 13

A lamination was manufactured by winding a pure niobium foil having 0.1 mm thickness and a pure aluminum foil having 0.03 mm thickness around a pure copper core having a diameter of 5.2 mm in the following manners: winding only the pure niobium foil around the core with the required number of turns at the winding start, thereby forming an inner diffusion barrier layer; then winding the pure niobium foil and the pure aluminum foil to overlap each other, and forming a $Nb_3Al$ phase in the case where the reaction of the pure niobium foil and the pure aluminum foil occurs; and again winding only the pure niobium foil with the required number of turns at the winding end, thereby forming an outer diffusion barrier layer. The manufactured lamination was inserted into a pure copper tube having an outer diameter of 12.3 mm and an inner diameter of 9.4 mm, and subjected to cold extrusion processing, and drawing processing by means of a carbide die and a diamond die, thereby obtaining a niobium-aluminum precursor wire having a final wire diameter of 0.05 mm and a single wire length of 1650 m. The volume ratio of the pure copper (namely, copper stabilizer) to the non-pure copper (namely, non-copper stabilizer) in the obtained niobium-aluminum precursor wire was 1.5. And the volume percentage of the pure copper (namely, copper stabilizer) in the above core located in the center was 30.1% with respect to the total volume of the pure copper in the above core and the pure copper (namely, copper stabilizer) in the pure copper tube. In other words, the proportion of the pure copper (namely, copper stabilizer) in the pure copper tube located at the outer periphery was 69.9%.

It has been confirmed that according to this example, which is an embodiment of the present invention, a niobium-aluminum precursor wire having a final wire diameter of 0.05 mm and a single wire length of 1,000 m or more can be obtained.

Example 14

A lamination was manufactured by winding a pure niobium foil having 0.1 mm thickness and a pure aluminum foil having 0.03 mm thickness around a pure copper core having a diameter of 5.5 mm in the following manners: winding only the pure niobium foil around the core with the required number of turns at the winding start, thereby forming an inner diffusion barrier layer; then winding the pure niobium foil and the pure aluminum foil to overlap each other, and forming a $Nb_3Al$ phase in the case where the reaction of the pure niobium foil and the pure aluminum foil occurs; and again winding only the pure niobium foil with the required number of turns at the winding end, thereby forming an outer diffusion barrier layer. The manufactured lamination was inserted into a pure copper tube having an outer diameter of 12.3 mm and an inner diameter of 9.0 mm, and subjected to cold extrusion processing, and drawing processing by means of a carbide die and a diamond die, thereby obtaining a niobium-aluminum precursor wire having a final wire diameter of 0.05 mm and a single wire length of 1750 m. The volume ratio of the pure copper (namely, copper stabilizer) to the non-pure copper (namely; non-copper stabilizer) in the obtained niobium-aluminum precursor wire was 2.0. And the volume percentage of the pure copper (namely, copper stabilizer) in the above core located in the center was 30.1% with respect to the total volume of the pure copper in the above core and the pure copper (namely, copper stabilizer) in the pure copper tube. In other words, the proportion of pure copper (namely, copper stabilizer) in the pure copper tube located at the outer periphery was 69.9%.

It has been confirmed that according to this example, which is an embodiment of the present invention, a niobium-aluminum precursor wire having a final wire diameter of 0.05 mm and a single wire length of 1,000 m or more can be obtained.

Table 1 summarizes the respective numerical values of the diameters of the pure copper cores (namely, copper cores), the inner and outer diameters of the pure copper tubes (namely, copper tubes), the volume percentages of the copper (namely, division rates of the copper) in the center and at the outer periphery; the volume ratios of the pure copper to the non-pure copper (namely, (pure copper/non-pure copper) ratio), the final wire diameters, and the single wire lengths in “Examples 1 to 14”.

TABLE 1

| Example | Copper core Diameter (mm) | Copper tube Inner diameter (mm) | Copper tube Outer diameter (mm) | Division rate of copper Center (%) | Division rate of copper Outer periphery (%) | (pure copper/non-pure copper) ratio | Final wire diameter (mm) | Single wire length (m) |
|---|---|---|---|---|---|---|---|---|
| Example 1 | 2.0 | 10.1 | 12.3 | 7.5 | 92.5 | 0.5 | 0.05 | 126 |
| Example 2 | 2.0 | 10.1 | 14.0 | 4.1 | 95.9 | 1.0 | 0.183 | 566 |
| Example 3 | 3.0 | 10.1 | 12.3 | 15.4 | 84.6 | 0.6 | 0.05 | 455 |
| Example 4 | 3.0 | 10.1 | 14.0 | 8.7 | 91.3 | 1.1 | 0.067 | 233 |
| Example 5 | 5.0 | 10.1 | 12.3 | 33.7 | 66.3 | 1.0 | 0.05 | 2063 |
| Example 6 | 6.0 | 10.6 | 12.3 | 48.0 | 52.0 | 1.0 | 0.05 | 1313 |
| Example 7 | 7.0 | 11.2 | 12.3 | 65.5 | 34.5 | 1.0 | 0.05 | 1466 |
| Example 8 | 6.0 | 10.1 | 14.0 | 27.7 | 72.3 | 2.0 | 0.07 | 134 |
| Example 9 | 9.0 | 13.0 | 14.0 | 75.0 | 25.0 | 1.2 | 0.12 | 30 |
| Example 10 | 10.0 | 13.6 | 14.0 | 90.1 | 9.9 | 1.3 | 0.2 | 10 |
| Example 11 | 4.0 | 10.8 | 12.3 | 31.6 | 68.4 | 0.5 | 0.05 | 2015 |
| Example 12 | 5.0 | 10.8 | 12.3 | 41.9 | 58.1 | 0.7 | 0.05 | 1957 |
| Example 13 | 5.2 | 9.4 | 12.3 | 30.1 | 69.9 | 1.5 | 0.05 | 1650 |
| Example 14 | 5.5 | 9.0 | 12.3 | 30.1 | 69.9 | 2.0 | 0.05 | 1750 |

Figure 13:
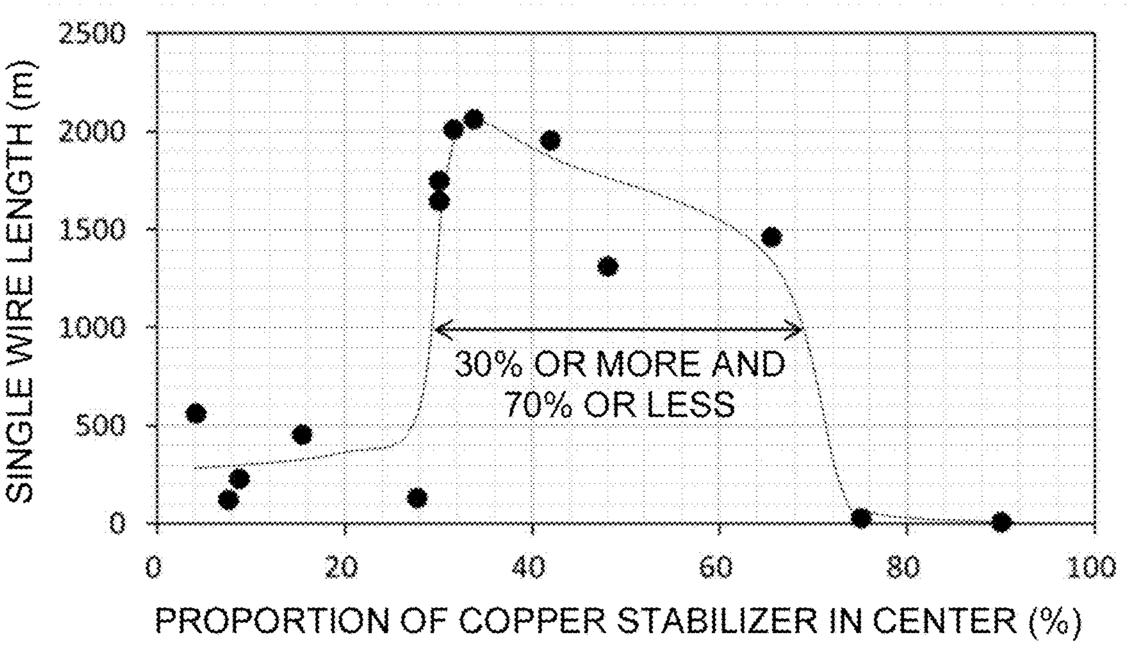
FIG. 13 is a diagram illustrating the relationship between a proportion of the copper stabilizer in the center and a single wire length obtained from a final wire diameter in Examples 1 to 14 of the Examples.

FIG. 13 summarizes the relationship between the proportion of the copper stabilizer in the center and the single wire length obtained from the final wire diameter in “Examples 1 to 14” of the Examples.

As illustrated in FIG. 13, it has been confirmed that in all of the niobium-aluminum precursor wires described in “Examples 5 to 7” and “Examples 11 to 14”, each of which is an aspect of the present invention, an ultra-fine final wire diameter of 0.05 mm and a long single wire length of 1,000 m or more can be obtained. From this, it has been confirmed that according to the present invention, an ultra-fine final wire diameter of 0.05 mm (50 μm) and a long single wire length of 1,000 m or more can be secured when the volume ratio of the copper stabilizer to the non-copper stabilizer, contained in the niobium-aluminum precursor wire is in a range of 0.5 or more and 2.0 or less, wherein the range is required in the case of processing the wire into a superconducting wire.

On the other hand, it has also been confirmed that in any of the niobium-aluminum precursor wires described in “Examples 1 to 4” and “Examples 8 to 10”, which do not belong to the aspects of the present invention, both securing an ultra-fine final wire diameter of 0.05 mm and securing a long single wire length of 1,000 m or more are not satisfied.

Consequently, it has been confirmed that according to the niobium-aluminum precursor wire of the present invention, in addition to securing a long single wire length of 1,000 m or more, an ultra-fine final wire diameter of 0.05 mm (50 μm) thinner than a human hair can be also secured, and thus the niobium-aluminum precursor wire of the present invention can exert bendability (so-called “flexibility”) and insulation treatment and coiling can be realized by handling similar to that of a niobium-titanium alloy wire even in the case where electromagnets are manufactured by using a niobium-aluminum ($Nb_3Al$) superconducting wire.

Manufacture of Niobium-Aluminum Superconducting Wire and Evaluation of its Characteristics

Example 15

Figure 14:
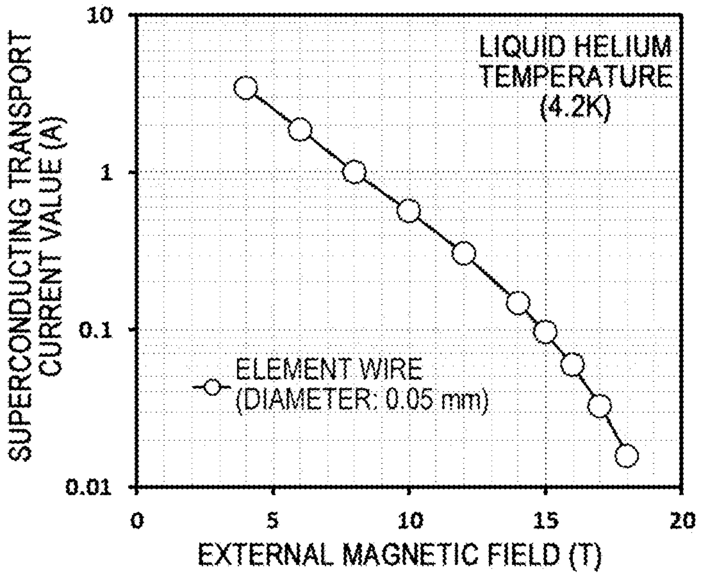
FIG. 14 is a diagram illustrating the relationship between an external magnetic field (unit: T (tesla)) and a superconducting transport current value (unit: A (ampere)) regarding a niobium-aluminum superconducting wire manufactured by heat-treating (condition: maintaining at 800° C. for 10 hours in a high vacuum of $10^{-3}$ Pa or less) a niobium-aluminum precursor wire (i.e., element wire) which has an outer diameter (i.e., final wire diameter) of 0.05 mm and is formed in Example 5 of the Examples.

Regarding a niobium-aluminum precursor wire obtained in "Example 5" of the Examples, wherein the niobium-aluminum precursor wire is an ultra-fine monofilamentary wire (i.e., element wire) and has a final wire diameter of 0.05 mm and a single wire length of 2063 m, one part thereof was cut out, and maintained at 800° C. for 10 hours in a high vacuum of $10^{-3}$ Pa or less so that a diffusion reaction occurs to generate a $Nb_3Al$ phase of a superconducting phase at the portion of the niobium/aluminum lamination, thereby manufacturing (i.e., producing) a niobium-aluminum superconducting wire. An external magnetic field of up to 18 T (tesla) was applied to this niobium-aluminum superconducting wire in liquid helium, and the superconducting transport current value that enables to pass the current with zero resistance was measured. FIG. 14 is a diagram illustrating the relationship between the superconducting transport current value and the external magnetic field at a liquid helium temperature of 4.2 K (Kelvin) of the monofilamentary wire (i.e., element wire). As a result, it has been confirmed that passing the current with zero resistance can be realized even when a high magnetic field of 18 T is applied, and that passing the current through a superconducting wire of 0.05 mm (50 μm) thinner than a human hair up to 3.5 A (ampere) can be realized when the magnetic field is lowered to 2 T.

Manufacture of Niobium-Aluminum Precursor Twisted Wire and Superconducting Twisted Wire and Evaluation of Their Characteristics

Example 16

Figure 15:
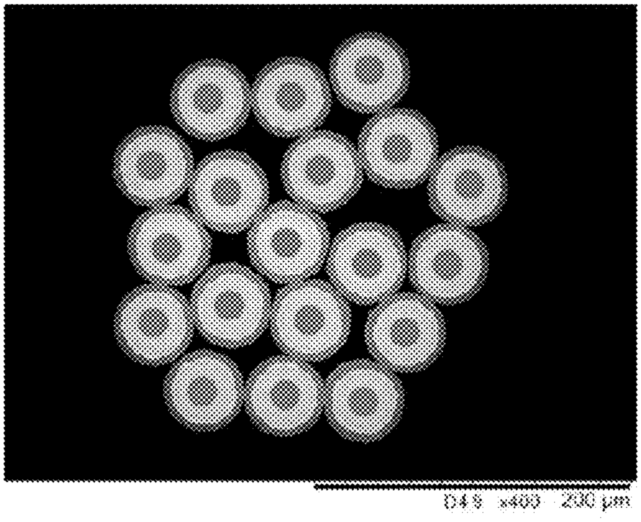
FIG. 15 is a diagram illustrating a cross-sectional structure of a niobium-aluminum precursor twisted wire, which is one first order twisted wire formed by carrying out an operation of bundling and twisting 19 niobium-aluminum precursor wires (i.e., 19 element wires), wherein each of the 19 niobium-aluminum precursor wires has an outer diameter (i.e., final wire diameter) of 0.05 mm and is formed in Example 5 of the Examples.
Figure 16:
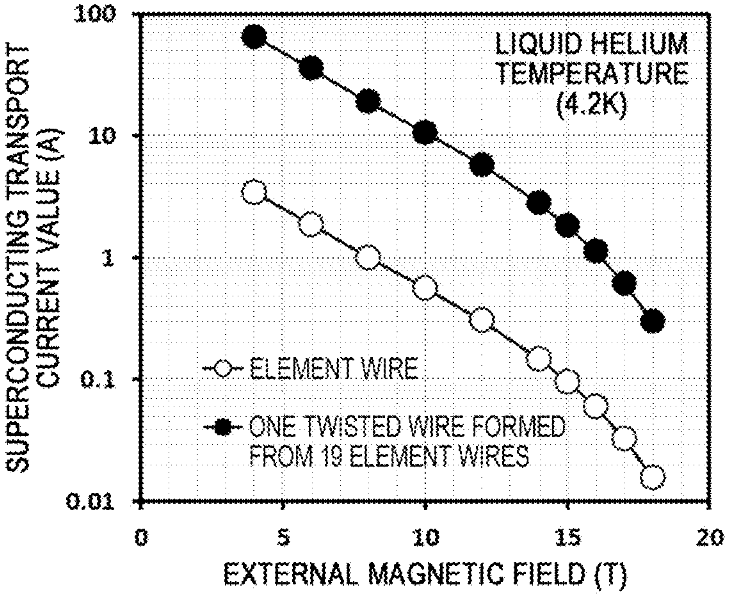
FIG. 16 is a diagram illustrating the relationship between an external magnetic field (unit: T (tesla)) and a superconducting transport current value (unit: A (ampere)) regarding a niobium-aluminum superconducting twisted wire manufactured by heat-treating (condition: maintaining at 800° C. for 10 hours in a high vacuum of $10^{-3}$ Pa or less) a niobium-aluminum precursor twisted wire (i.e., first order twisted wire), which is one twisted wire formed by carrying out an operation of bundling and twisting 19 niobium-aluminum precursor wires (i.e., element wires), wherein each of the 19 niobium-aluminum precursor wires has an outer diameter (i.e., element wire final wire diameter) of 0.05 mm and is formed in Example 5 of the Examples. In the figure, the results in FIG. 14 are also illustrated.

Regarding a niobium-aluminum precursor wire obtained in "Example 5" of the Examples, wherein the niobium-aluminum precursor wire is an ultra-fine monofilamentary wire (i.e., element wire) and has a final wire diameter of 0.05 mm and a single wire length of 2063 m, one part thereof was used to prepare 19 monofilamentary wires, and by bundling and twisting the 19 monofilamentary wires, one niobium-aluminum precursor twisted wire (i.e., first order twisted wire) was manufactured (i.e., produced). FIG. 15 illustrates a cross-sectional view of the manufactured twisted wire. This cross-sectional view is the result of measurement by means of a tabletop electron microscope instrument (model: TM3030Plus) manufactured by Hitachi, Ltd. under the conditions for backscattered electron image observation. As illustrated in FIG. 15, it has been confirmed that there is no damage to the appearance due to the above bundling and twisting processing. Further, one part of the above twisted wire was cut out, and maintained at 800° C. for 10 hours in a high vacuum of $10^{-3}$ Pa or less so that a diffusion reaction occurs to generate a $Nb_3Al$ phase of a superconducting phase at the portion of the niobium/aluminum lamination, thereby manufacturing (i.e., producing) a niobium-aluminum superconducting wire. An external magnetic field of up to 18 T was applied to this niobium-aluminum superconducting twisted wire in liquid helium, and the superconducting transport current value that enables to pass the current with zero resistance was measured. FIG. 16 is a diagram illustrating the relationship between the superconducting transport current value and the external magnetic field at a liquid helium temperature of 4.2 K (Kelvin) of the superconducting twisted wire. In FIG. 16, the results in FIG. 14 for reference are also illustrated. As a result, it has been confirmed that in a magnetic field of 2 T, a large current exceeding 65 A can pass with zero resistance, and even in a high magnetic field of 15 T, a current of 2 A can pass with zero resistance. It has been found that those values correspond to a superconducting transport current of exactly 19 times that of the monofilamentary wire having an outer diameter of 0.05 mm in "Example 15", and it has been found that there is no damage to the superconducting characteristics due to the above bundling and twisting processing. In this case, it has been found that since the respective monofilamentary wires are in contact with each other somewhere, the current transfers at the contact positions, thereby passing the current uniformly throughout the twisted wire.

Example 17

Figure 17:
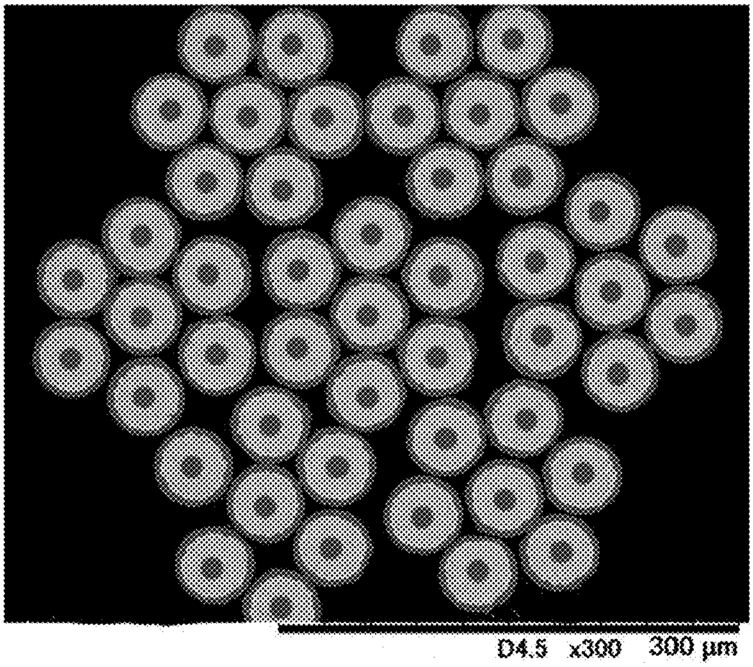
FIG. 17 is a diagram illustrating a cross-sectional structure of a niobium-aluminum precursor twisted wire, which is one twisted wire (i.e., second order twisted wire) formed by the following processes: forming one niobium-aluminum precursor twisted wire (i.e., first order twisted wire) by carrying out an operation of bundling and twisting 7 niobium-aluminum precursor wires (i.e., element wires), wherein each of the 7 niobium-aluminum precursor wires has an outer diameter (i.e., final wire diameter) of 0.05 mm and is formed in Example 5 of the Examples; and carrying out an operation of bundling and twisting 7 niobium-aluminum precursor twisted wires, wherein each of the 7 niobium-aluminum precursor twisted wires is the niobium-aluminum precursor twisted wire (i.e., first order twisted wire) formed by carrying out the operation of bundling and twisting the 7 niobium-aluminum precursor wires.

Regarding a niobium-aluminum precursor wire obtained in "Example 5" of the Examples, wherein the niobium-aluminum precursor wire is an ultra-fine monofilamentary wire (i.e., element wire) and has a final wire diameter of 0.05 mm and a single wire length of 2063 m, one part thereof was used to prepare 7 monofilamentary wires, and by bundling and twisting the 7 monofilamentary wires, one niobium-aluminum precursor twisted wire (i.e., first order twisted wire) was manufactured. In this way, 7 of these niobium-aluminum precursor twisted wires (i.e., 7 first order twisted wires) were prepared. And it has been confirmed that by bundling and twisting the 7 niobium-aluminum precursor twisted wires (i.e., 7 first order twisted wires) to form one niobium-aluminum precursor twisted wire, a second order twisted wire was manufactured. FIG. 17 illustrates a cross-sectional view of the manufactured twisted wire. This cross-sectional view is the result of measurement by means of a tabletop electron microscope instrument (model: TM3030Plus) manufactured by Hitachi, Ltd. under the conditions for backscattered electron image observation. As illustrated in FIG. 17, it has been confirmed that there is no damage to the appearance due to the above bundling and twisting processing. Furthermore, it has been confirmed that a third order twisted wire can be manufactured by bundling and twisting a plurality (i.e., two or more) of the second order twisted wires to form one twisted wire and that there is no damage to the appearance (not illustrated). It has been confirmed that a high order twisted wire of a fourth or more order twisted wire can be manufactured by repeating such an operation and there is no damage to the appearance (not illustrated).

It has also been confirmed (not illustrated) that even in the case of a niobium-aluminum precursor twisted wire processed into a second or higher order twisted wire, by carrying out, as is in the case with the first order niobium-aluminum precursor twisted wire, the process of maintaining the second or higher order niobium-aluminum twisted wire at 800° C. for 10 hours in a high vacuum of $10^{-3}$ Pa or less so that a diffusion reaction occurs to generate a $Nb_3Al$ phase of a superconducting phase at the portion of the niobium/aluminum lamination, the second or higher order niobium-aluminum twisted wire (namely, niobium-aluminum superconducting twisted wire) exhibiting superconducting characteristics and no damage due to the bundling and twisting processing can be manufactured.

It has also been found that by bundling and twisting the required number of twisted wires in this manner, a niobium-aluminum twisted wire (namely, niobium-aluminum superconducting twisted wire) capable of extremely easily and freely increasing the current capacity to the desired current capacity can be manufactured (i.e., produced).

It has also been found that even in any case of niobium-aluminum precursor twisted wires or niobium-aluminum superconducting twisted wires having a $NB_3Al$ phase of a superconducting phase generated by heat-treating the niobium-aluminum precursor twisted wires, the individual niobium-aluminum precursor wires or the individual niobium-aluminum superconducting wires, which are ultra-fine monofilamentary wires having a final wire diameter of 0.05 mm or less, do not adhere to each other, so that the monofilamentary wires (i.e., niobium-aluminum precursor wires or niobium-aluminum superconducting wires) can smoothly slide locally inside the twisted wire (i.e., niobium-aluminum precursor twisted wire or niobium-aluminum superconducting twisted wire) when being bent, thereby relieving the strain.

Industrial Applicability

The present invention is highly expected to be used and applied to various superconducting application instruments, such as medical MRI, NMR spectrometers, linear motor cars, high-energy particle accelerators, nuclear fusion reactors, superconducting motors, and superconducting generators. Therefore, the present invention can be used in a wide variety of industries (for example, medical instrument industry, electrical/communication instrument industry, transportation industry, and energy industry).

REFERENCE SIGNS LIST

1 Copper tube (which is formed of copper stabilizer or copper stabilizer and non-copper stabilizer)
2, 4 Diffusion barrier layer (which is formed of niobium, tantalum, or the like)
3 Lamination (which is formed of niobium/aluminum)
5 Core (which is formed of copper stabilizer or copper stabilizer and non-copper stabilizer)

The invention claimed is:

1. A niobium-aluminum precursor wire comprising: a rod-shaped core that is formed of a copper stabilizer or that is formed of a copper stabilizer and a non-copper stabilizer; a lamination that is wound around the core and that has a structure of overlapping an aluminum foil and a niobium foil; and a covering body that covers a periphery of the lamination, wherein the covering body is formed of the copper stabilizer or is formed of the copper stabilizer and the non-copper stabilizer, wherein a volume ratio of the copper stabilizer to the non-copper stabilizer, contained in the niobium-aluminum precursor wire is 0.5 or more and 2.0 or less; and the niobium-aluminum precursor wire satisfying, with respect to a total volume of the volume of the copper stabilizer contained in the core and the volume of the copper stabilizer contained in the covering body, the following conditions: (1) a volume percentage of the copper stabilizer contained in the core is in a range of 30% to 70%; and (2) a volume percentage of the copper stabilizer contained in the covering body is in a range of 70% to 30%, wherein a total of the volume percentage of the copper stabilizer contained in the core and the volume percentage of the copper stabilizer contained in the covering body is 100%.

2. The niobium-aluminum precursor wire according to claim 1, wherein the volume ratio of the copper stabilizer to the non-copper stabilizer, contained in the precursor wire is 0.9 or more and 2.0 or less.

3. The niobium-aluminum precursor wire according to claim 1, comprising a layer formed of a substance exhibiting low reactivity to an aluminum and a copper, wherein the layer is between the core and the lamination.

4. The niobium-aluminum precursor wire according to claim 1, comprising a layer formed of a substance exhibiting low reactivity to an aluminum and a copper, wherein the layer is between the lamination and the covering body.

5. The niobium-aluminum precursor wire according to claim 1, having an outer diameter of 0.05 mm or less.

6. A niobium-aluminum precursor twisted wire, which is one first order twisted wire formed by carrying out an operation of bundling and twisting two or more niobium-aluminum precursor wires, wherein each of the two or more niobium-aluminum precursor wires is the niobium-aluminum precursor wire according to claim 1.

7. A niobium-aluminum precursor twisted wire, which is one second order twisted wire formed by carrying out, one time, an operation of bundling and twisting two or more niobium-aluminum precursor twisted wires, wherein each of the two or more niobium-aluminum precursor twisted wires used in the bundling and twisting operation is the niobium-aluminum precursor twisted wire according to claim 6.

8. A niobium-aluminum precursor twisted wire, which is one third order twisted wire formed by carrying out, two times, an operation of bundling and twisting two or more niobium-aluminum precursor twisted wires, wherein the niobium-aluminum precursor twisted wire of the one third order twisted wire manufactured by the bundling and twisting operation carried out for a second time is one manufactured by carrying out the operation of bundling and twisting two or more niobium-aluminum precursor twisted wires, wherein each of the two or more niobium-aluminum precursor twisted wires is one manufactured by the bundling and twisting operation carried out for a first time, and wherein each of two or more niobium-aluminum precursor twisted wires used in the bundling and twisting operation carried out for the first time is the niobium-aluminum precursor twisted wire according to claim 6.

9. A niobium-aluminum precursor twisted wire, which is an (n+1) order twisted wire formed by carrying out, n times (wherein the n is an integer 3 or more), an operation of bundling and twisting two or more niobium-aluminum precursor twisted wires to form one twisted wire, wherein a niobium-aluminum precursor twisted wire manufactured by the bundling and twisting operation carried out at each time after a second time is one manufactured by carrying out the operation of bundling and twisting two or more niobium-aluminum precursor twisted wires, wherein each of the two or more niobium-aluminum precursor twisted wires is one manufactured by carrying out the bundling and twisting operation one before manufacturing the each of the two or more niobium-aluminum precursor twisted wires, and wherein each of two or more niobium-aluminum precursor twisted wires used in the bundling and twisting operation carried out for a first time is the niobium-aluminum precursor twisted wire according to claim 6.

10. A niobium-aluminum superconducting wire, comprising a superconducting phase imparted by heat-treating the niobium-aluminum precursor wire according to claim 1.

11. The niobium-aluminum superconducting wire according to claim 10, wherein the superconducting phase comprises a phase represented by $Nb_3Al$.

12. A niobium-aluminum superconducting twisted wire, comprising a superconducting phase imparted by heat-treating the niobium-aluminum precursor twisted wire according to claim 6.

13. The niobium-aluminum superconducting twisted wire according to claim 12, wherein the superconducting phase comprises a phase represented by $Nb_3Al$.

* * * * *